US008867094B2

(12) United States Patent
Fujise et al.

(10) Patent No.: US 8,867,094 B2
(45) Date of Patent: Oct. 21, 2014

(54) PRINTING SYSTEM, IMAGE FORMING APPARATUS, AND PRINTING METHOD FOR DETECTING IMAGE DEFECTS

(75) Inventors: Masaki Fujise, Kanagawa (JP); Toshiyuki Kazama, Kanagawa (JP); Kenji Hyoki, Kanagawa (JP)

(73) Assignee: Fuji Xerox Co., Ltd., Tokyo (JP)

(*) Notice: Subject to any disclaimer, the term of this patent is extended or adjusted under 35 U.S.C. 154(b) by 180 days.

(21) Appl. No.: 13/548,970

(22) Filed: Jul. 13, 2012

(65) Prior Publication Data

US 2013/0250316 A1 Sep. 26, 2013

(30) Foreign Application Priority Data

Mar. 26, 2012 (JP) ................................ 2012-069014

(51) Int. Cl.
*G06K 15/02* (2006.01)

(52) U.S. Cl.
USPC .......................................... 358/1.9; 358/3.26

(58) Field of Classification Search
CPC . G06K 15/02; G06K 15/027; G06K 15/1867; H04N 1/00; H04N 1/00002; H04N 1/00005; H04N 1/00007; H04N 1/00026; H04N 1/00092
USPC ........... 358/1.1, 1.2, 1.9, 2.1, 3.26, 400, 401, 358/448; 382/254, 275, 309
See application file for complete search history.

(56) References Cited

U.S. PATENT DOCUMENTS

| | | | | |
|---|---|---|---|---|
| 7,136,191 | B2 * | 11/2006 | Kaltenbach et al. | 358/1.9 |
| 7,376,269 | B2 * | 5/2008 | Klassen et al. | 382/167 |
| 7,433,508 | B2 * | 10/2008 | Sakai et al. | 382/144 |
| 8,488,199 | B2 * | 7/2013 | Kawamoto | 358/3.06 |

FOREIGN PATENT DOCUMENTS

| | | | |
|---|---|---|---|
| JP | 5-72710 | A | 3/1993 |
| JP | 2000-123176 | A | 4/2000 |
| JP | 2006297739 | A | 11/2006 |
| JP | 2007-33247 | A | 2/2007 |
| JP | 2010-42634 | A | 2/2010 |
| JP | 2010-66516 | A | 3/2010 |

OTHER PUBLICATIONS

Office Action issued by Australian Patent Office in corresponding Australian Patent application No. 2012205245, dated Apr. 23, 2013.
Office Action issued by Australian Patent Office in corresponding Australian Patent application No. 2012205245, dated Jul. 25, 2013.

* cited by examiner

*Primary Examiner* — Thomas D Lee
(74) *Attorney, Agent, or Firm* — Sughrue Mion, PLLC

(57) ABSTRACT

A printing system includes following components. An image forming section forms an image on a recording medium using first image data. A first image creation section creates the first image data by performing first image processing including correction of a characteristic unique to the image forming section and first processing, on original image data. The second image creation section creates second image data by performing second image processing including the first processing but not including the correction of a characteristic unique to the image forming section, on the original image data. The image reading section reads the image on the recording medium to obtain read image data. The detection section detects a defect in the image on the recording medium, by comparing on a pixel-by-pixel basis the read image data or comparison image data obtained by processing the read image data with the second image data.

8 Claims, 16 Drawing Sheets

PRINTING SYSTEM, IMAGE FORMING APPARATUS, AND PRINTING METHOD FOR DETECTING IMAGE DEFECTS

CROSS-REFERENCE TO RELATED APPLICATIONS

This application is based on and claims priority under 35 USC 119 from Japanese Patent Application No. 2012-069014 filed Mar. 26, 2012.

BACKGROUND

Technical Field

The present invention relates to a printing system, an image forming apparatus, and a printing method.

SUMMARY

According to an aspect of the invention, there is provided a printing system including an image forming section, a first image creation section, a second image creation section, an image reading section, and a detection section. The image forming section forms an image on a recording medium by using first image data input to the image forming section. The first image creation section creates the first image data by performing first image processing on original image data input from the outside, the first image processing including correction of a characteristic that is unique to the image forming section and first processing that is different from the correction of a characteristic that is unique to the image forming section. The second image creation section creates second image data by performing second image processing on the original image data, the second image processing including the first processing, but not including the correction of a characteristic that is unique to the image forming section. The image reading section reads the image having been formed on the recording medium by the image forming section to obtain read image data. The detection section detects a defect in the image having been formed on the recording medium by the image forming section, by comparing the read image data resulting from the reading performed by the image reading section or comparison image data obtained by performing processing on the read image data with the second image data on a pixel-by-pixel basis, the read image data and the second image data being obtained from the same original image data.

BRIEF DESCRIPTION OF THE DRAWINGS

Exemplary embodiments of the present invention will be described in detail based on the following figures, wherein.

DETAILED DESCRIPTION

Exemplary embodiments of the present invention will be described in detail below with reference to the accompanying drawings.

First Exemplary Embodiment

Figure 1:
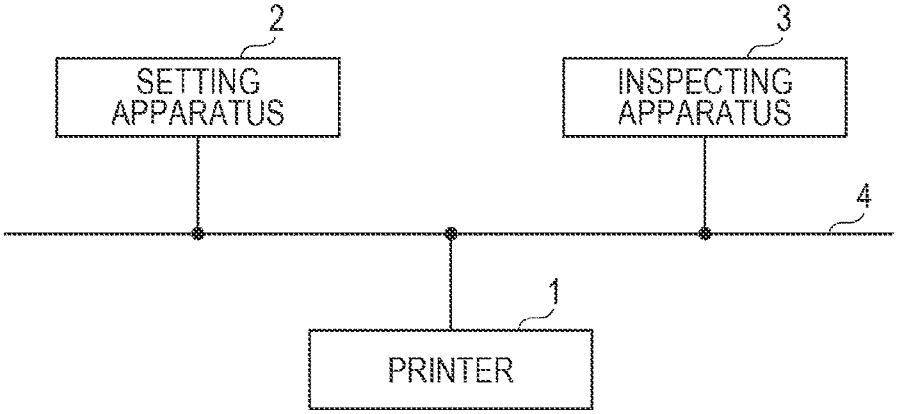
FIG. 1 illustrates a configuration of a printing system.

FIG. 1 illustrates a configuration of a printing system to which this exemplary embodiment is applied.

The printing system according to this exemplary embodiment includes a printer 1 that prints an image on a sheet of paper, a setting apparatus 2 that sets image data (original image data) to be printed in the printer 1 and sets a print condition, an inspecting apparatus 3 that inspects content of an image (printed image) having been printed on a sheet of paper by the printer 1, and a network 4 that connects the printer 1, the setting apparatus 2, and the inspecting apparatus 3 to each other.

Figure 2:
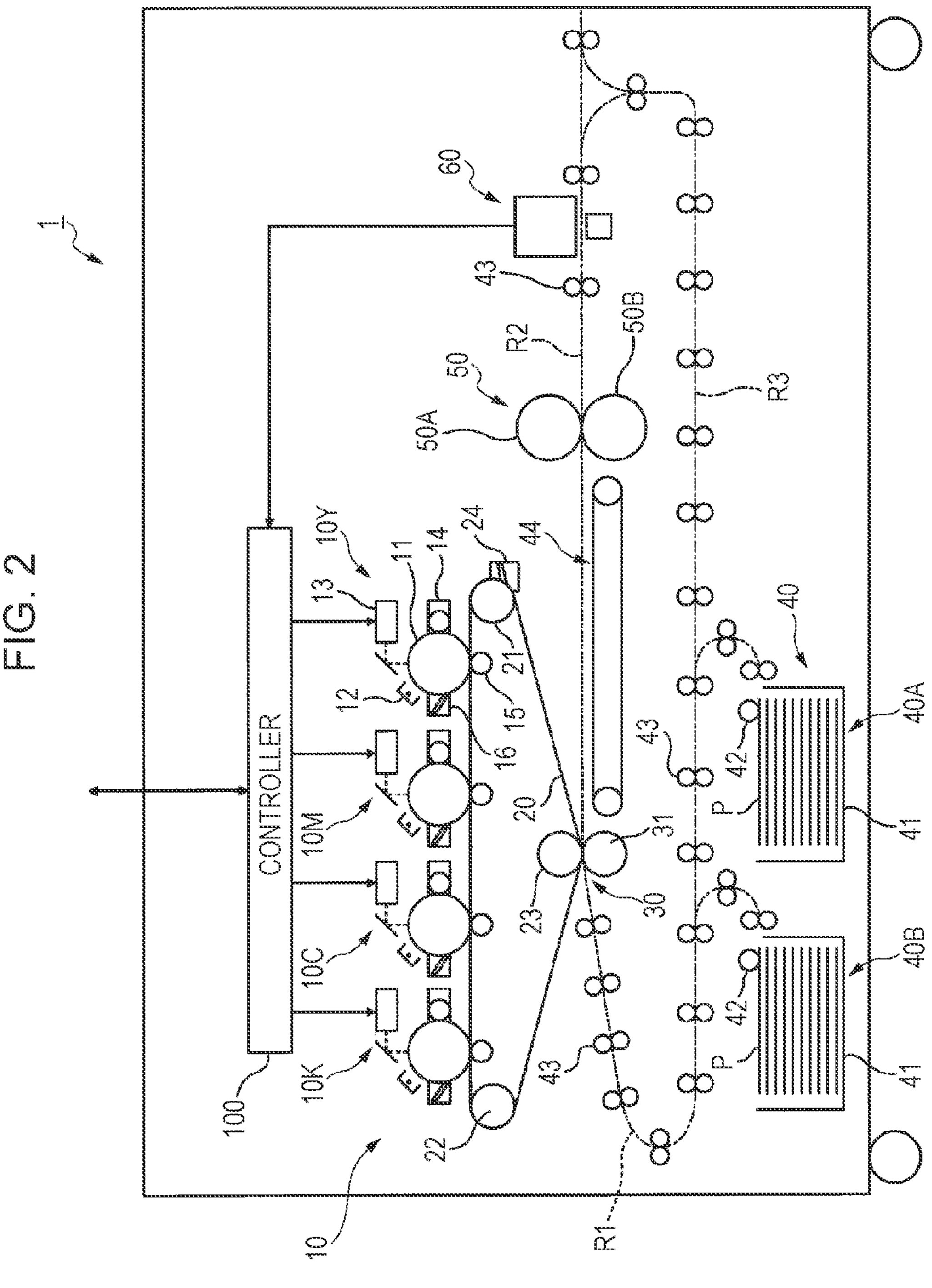
FIG. 2 illustrates a configuration of a printer.

FIG. 2 illustrates a configuration of the printer 1. The printer 1 according to this exemplary embodiment is a plateless printer that prints an image by using the electrophotography.

This printer 1 has a so-called tandem configuration, and includes multiple image forming units 10Y, 10M, 10C, and 10K that form toner images of corresponding color components by using the electrophotography. The printer 1 also includes a controller 100, which includes a central processing unit (CPU), a read only memory (ROM), and a random access memory (RAM), and which controls operations (including image processing) of devices and sections of the printer 1. Here, the image forming units 10Y, 10M, 10C, and 10K form yellow, magenta, cyan, and black images, respectively.

The printer 1 also includes an intermediate transfer belt 20 onto which the toner images of the corresponding color components having been formed by the image forming units 10Y, 10M, 10C, and 10K are sequentially transferred (first transfer) and which holds the transferred toner images, and a second transfer device 30 which collectively transfers (second transfer) the toner images held on the intermediate transfer belt 20 onto paper P, which is an example of a rectangular recording medium.

Each of the image forming units 10Y, 10M, 10C, and 10K includes a photoconductor drum 11, which is an example of a rotatable photoconductor. Around the photoconductor drum 11 in each of the image forming units 10Y, 10M, 10C, and 10K, there are disposed a charging device 12 that charges the photoconductor drum 11, an exposure device 13 that exposes the photoconductor drum 11 to light so as to write an electrostatic latent image on the photoconductor drum 11, and a developing device 14 that visualizes the electrostatic latent image on the photoconductor drum 11 by using toner of the corresponding color. Furthermore, each of the image forming units 10Y, 10M, 10C, and 10K includes a first transfer device 15 that transfers the toner image of the corresponding color component having been formed on the photoconductor drum 11 onto the intermediate transfer belt 20, and a drum cleaning device 16 that removes the remaining toner from the photoconductor drum 11. In this exemplary embodiment, each exposure device 13 exposes the corresponding photoconductor drum 11 to light by using a multi-beam laser, which will be described in detail later.

The intermediate transfer belt 20 is stretched around three rotatable rollers 21 to 23 so as to rotate therearound. Among these three rollers 21 to 23, the roller 22 drives the intermediate transfer belt 20. The roller 23 is arranged so as to face a second transfer roller 31 with the intermediate transfer belt 20 disposed therebetween. The second transfer roller 31 and the roller 23 constitute the second transfer device 30. A belt cleaning device 24 that removes the remaining toner from the intermediate transfer belt 20 is disposed at a position where the belt cleaning device 24 faces the roller 21 with the intermediate transfer belt 20 disposed therebetween.

The printer 1 has a first transport route R1 along which paper P transported toward the second transfer device 30 passes, a second transport route R2 along which the paper P having passed the second transfer device 30 passes, and a third transport route R3 that splits from the second transport route R2 on the downstream side of a fixing device 50 (to be described later) and extends to the bottom part of the first transport route R1 so as to lead the paper P to the first transport route R1 again. Pieces of paper P that are not led to the third transport route R3, among those having been transported along the second transport route R2, are discharged to the outside of the printer 1 and are stacked on a paper tray, not illustrated.

The printer 1 also includes a paper transporting section 40 that transports the paper P along the first transport route R1, the second transport route R2, and the third transport route R3. This paper transporting section 40 includes a first paper feeding device 40A that feeds the paper P to the first transport route R1, and a second paper feeding device 40B that is disposed on the downstream side of the first paper feeding device 40A in the transport direction of the paper P and that feeds the paper P to the first transport route R1. The first paper feeding device 40A and the second paper feeding device 40B have substantially the same structure. Specifically, each of the first paper feeding device 40A and the second paper feeding device 40B includes a paper storage unit 41 that stores the paper P, and a pickup roller 42 that picks up and transports the paper P stored in the paper storage unit 41. The paper P of different sizes and orientations or of different types may be stored in the first paper feeding device 40A and the second paper feeding device 40B.

The paper transporting section 40 further includes plural transporting rollers 43 that transport the paper P while holding the paper P therebetween, along the first transport route R1, the second transport route R2, and the third transport route R3. The paper transporting section 40 also includes, along the second transport route R2, a belt transporting unit 44 that transports the paper P having passed the second transfer device 30 toward the fixing device 50.

The printer 1 further includes, along the second transport route R2, the fixing device 50 that fixes on the paper P an image having been transferred onto the paper P by the second transfer device 30. This fixing device 50 includes a heat roller 50A that is heated by a built-in heater (not illustrated), and a pressing roller 50B that presses the heat roller 50A. The paper P passes between the heat roller 50A and the pressing roller 50B, whereby the paper P is heated and pressed, and consequently the image on the paper P is fixed on the paper P in this fixing device 50.

In the following description, the image forming units 10Y, 10M, 10C, and 10K, the intermediate transfer belt 20, the second transfer device 30, the paper transporting section 40, and the fixing device 50 that have been described above are collectively referred to as an image forming section 10. The image forming section 10 according to this exemplary embodiment has exemplary functions of an image forming section.

The printer 1 according to this exemplary embodiment is capable of printing images not only on a first side of the paper P fed from the first paper feeding device 40A or the like but also on a second side of the paper P. More specifically, in this printer 1, the paper P having passed the fixing device 50 after transferring of an image on the first side of the paper P is transported along the third transport route R3, whereby the paper P is turned over and the turned over paper P is fed again to the second transfer device 30. An image is then transferred onto the second side of the paper P by the second transfer device 30. Subsequently, the paper P again passes through the fixing device 50, in which the transferred image is fixed on the paper P. In this manner, images are formed not only on the first side but also on the second side of the paper P.

In addition, the printer 1 according to this exemplary embodiment includes an image reading section 60 that reads an image printed on the paper P through the second transfer and fixing processes. The image reading section 60 is disposed along the second transport route R2 on the downstream side of the fixing device 50 and on the upstream side of the splitting point of the second transport route R2 and the third transport route R3 in the transport direction of the paper P. The image reading section 60 serving as an example of an image reading section reads an image on a side of the paper P that has faced the intermediate transfer belt 20 among the sides of the paper P having passed the second transfer device 30, i.e., an image on the side of the paper P having undergone the last second transfer. Here, the image reading section 60 includes three line sensors (not illustrated), which are arranged, for example, in the direction intersecting the transport direction of the paper P and which read images formed in red (R), green (G), and blue (B). Each line sensor reads one side of the transported paper P on a line-by-line basis. However, the image reading section 60 is not limited to this configuration and may include a two-dimensional area sensor that reads images formed in red, green, and blue.

Figure 3:
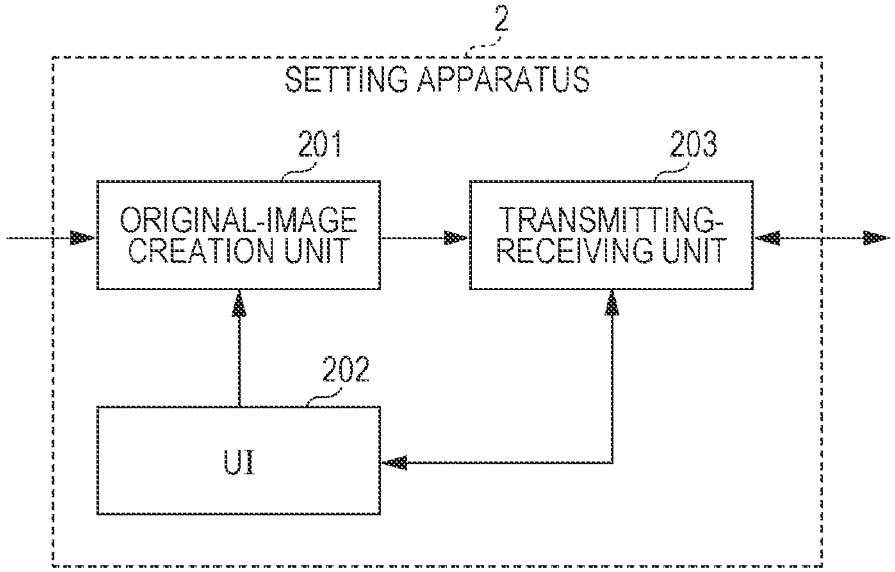
FIG. 3 is a block diagram illustrating a functional configuration of a setting apparatus.

FIG. 3 is a block diagram illustrating a functional configuration of the setting apparatus 2 illustrated in FIG. 1. The setting apparatus 2 according to this exemplary embodiment is constituted by a computer that includes a CPU, a ROM, and a RAM. Here, the setting apparatus 2 is a section called digital front end (DFE) that performs data processing for inputting data to the printer 1 when a job for continuously printing images on one or more pieces of paper P is executed in response to one instruction.

This setting apparatus 2 includes an original-image creation unit 201, a user interface (UI) 202, and a transmitting-receiving unit 203.

For example, on the basis of image data input from the outside, the original-image creation unit 201 creates "original image data" that is interpretable by the printer 1.

The UI 202 accepts input of various settings for printing before the printer 1 performs printing based on the original image data. Here, examples of the settings accepted via the UI 202 include settings regarding the color space for defining the original image data, the resolution used when printing based on the original image data is performed, and the type of the paper P used in the printing. However, the input image data may include information on the color space and the resolution. In the following description, the color space of the original image data is referred to as a "set color space", whereas the resolution of the original image data is referred to as a "set resolution". In this example, the set color space is defined as the CMYK color space, and the set resolution is set to 600 dots per inch (dpi). The UI 202 also displays an image based on data that is transmitted from the printer 1 or the inspecting apparatus 3 illustrated in FIG. 1 via the network 4, on a display not illustrated.

The transmitting-receiving unit 203 transmits and receives various kinds of data to and from the printer 1 and the inspecting apparatus 3 illustrated in FIG. 1 via the network 4.

Figure 4:
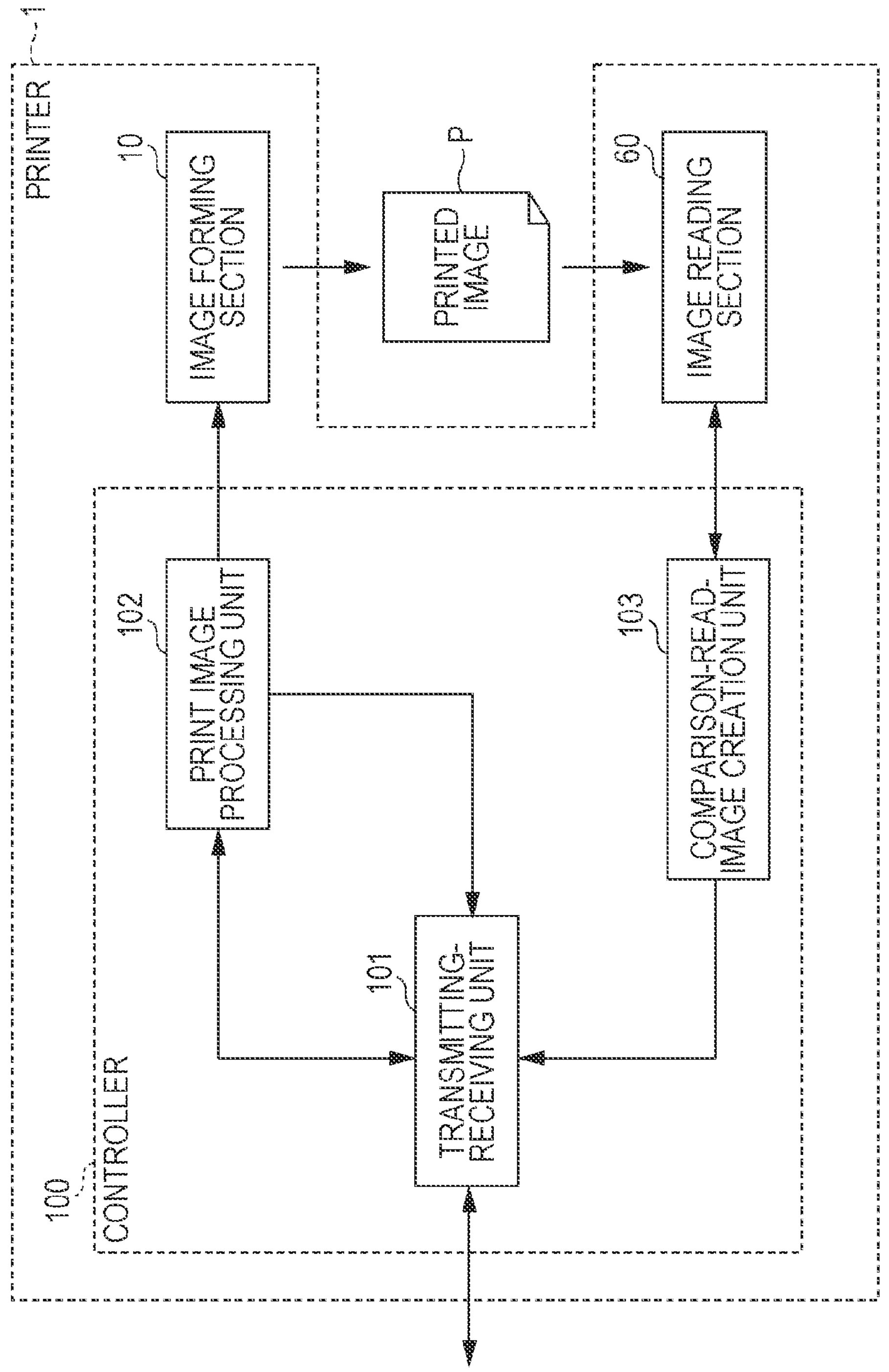
FIG. 4 is a block diagram illustrating a functional configuration of the printer.

FIG. 4 is a block diagram illustrating a functional configuration of the printer 1 illustrated in FIGS. 1 and 2.

The printer 1 according to this exemplary embodiment includes the image forming section 10 that prints an image on the paper P, the image reading section 60 that reads an image having been printed on the paper P, and the controller 100 that controls the image forming section 10 and the image reading section 60. The controller 100 includes a transmitting-receiving unit 101, a print image processing unit 102, and a comparison-read-image creation unit 103.

The transmitting-receiving unit 101, serving as an example of an output section, transmits and receives various kinds of data to and from the setting apparatus 2 and the inspecting apparatus 3 illustrated in FIG. 1 via the network 4.

The print image processing unit 102 performs various kinds of image processing on original image data that is input from the setting apparatus 2 via the transmitting-receiving unit 101, thereby creating "print original image data" handled in the image forming section 10 and "comparison original image data" serving as a reference in image defect inspection to be described later. Here, the "print original image data" is an example of first image data, whereas the "comparison original image data" is an example of second image data.

When creating the print original image data from the original image data, the print image processing unit 102 converts the set color space of the original image data into a color space (referred to as an "output color space") for colorants used in the image forming section 10, if necessary. In this example, the output color space is defined as the CMYK color space, which is for colorants (cyan, magenta, yellow, and black in this example) used in the image forming section 10 and which is the same as the set color space. When creating the print original image data from the original image data, the print image processing unit 102 sets a resolution (referred to as an "output resolution") that is based on the set resolution of the original image data, if necessary. The output resolution is decided by the resolution set in the image forming section 10 (more specifically, the exposure devices 13). In this example, the output resolution is set to 2400 dpi.

When creating the comparison original image data from the original image data, the print image processing unit 102 converts the set color space of the original image data into a color space (referred to an "inspection color space") handled in image defect inspection, if necessary. In this example, the inspection color space is defined as the CMYK color space, which is the same as the set color space. When creating the comparison original image data from the original image data, the print image processing unit 102 also converts the set resolution into a resolution (referred to as an "inspection resolution") handled in image defect inspection, if necessary. In this example, the inspection resolution is set to the 600 dpi, which is equal to the set resolution.

By using the print original image data created by the print image processing unit 102, the image forming section 10 prints an image (printed image) based on the output color space and the output resolution on the paper P.

The image reading section 60 reads the printed image on the paper P, by using three line sensors. The image reading section 60 then creates "read image data" on the basis of results of the reading input from the line sensors. Here, when creating the read image data from the reading results of the printed image, the image reading section 60 sets the color space of the read image data to a color space (referred to as an "input color space") for colors read by the line sensors. In this example, the input color space is defined as the RGB color space for the colors (red, green, and blue in this example) handled by the line sensors of the image reading section 60. When creating the read image data from the reading results of the printed image, the image reading section 60 sets a resolution (referred to as an "input resolution") based on the reading results. The input resolution is decided by intervals at which plural sensors included in each line sensor are arranged, a reading cycle of each line sensor, the speed at which the paper P is transported, and so forth. In this example, the input resolution is set to 600 dpi, which is equal to the set resolution and the inspection resolution.

The comparison-read-image creation unit 103 creates "comparison read image data" that is to undergo image defect inspection to be described later, on the basis of the read image data input from the image reading section 60. The "comparison read image data" is an example of comparison image data. Here, when creating the comparison read image data from the read image data, the comparison-read-image creation unit 103 converts the input color space of the read image data into the aforementioned inspection color space (the CMYK color space in this example) if necessary. When creating the comparison read image data from the read image data, the comparison-read-image creation unit 103 also converts the input resolution into the aforementioned inspection resolution (600 dpi in this example) if necessary.

The inspection resolution is decided on the basis of the relationship between the output resolution set in the image forming section 10 and the input resolution set in the image reading section 60. For example, when the output resolution is equal to the input resolution, the inspection resolution is set equal to the output resolution and the input resolution. When the output resolution is not equal to the input resolution, resolution conversion is performed on a higher resolution (e.g., the output resolution) among these resolutions so that the higher resolution becomes equal to the lower resolution (e.g., the input resolution). However, the conversion process is not limited to this particular process, and the resolution conversion may be performed on both the output resolution and the input resolution to decrease the resolutions.

Figure 5:
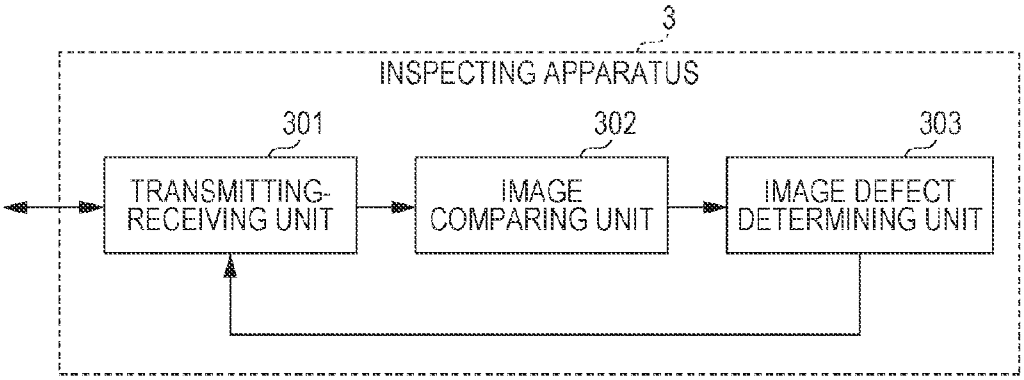
FIG. 5 is a block diagram illustrating a functional configuration of an inspecting apparatus.

FIG. 5 is a block diagram illustrating a functional configuration of the inspecting apparatus 3 illustrated in FIG. 1. The inspecting apparatus 3 according to this exemplary embodiment is constituted by a computer that includes a CPU, a ROM, and a RAM. This inspecting apparatus 3 inspects a printed image having been printed on the paper P by the printer 1 for a defect.

The inspecting apparatus 3 includes a transmitting-receiving unit 301, an image comparing unit 302, and an image defect determining unit 303.

The transmitting-receiving unit 301 transmits and receives various kinds of data to and from the printer 1 and the setting apparatus 2 illustrated in FIG. 1 via the network 4.

The image comparing unit 302 compares a value of each pixel of the comparison original image data with a value of a corresponding pixel of the comparison read image data. Here, the comparison original image data and the comparison read image data are input from the printer 1 via the transmitting-receiving unit 301 and are obtained from the same original image data.

On the basis of a result of the comparison performed by the image comparing unit 302, the image defect determining unit 303 determines whether or not there is a defect in the printed image having been printed on the paper P regarding the original image data. A result of this determination is transmitted to the setting apparatus 2 via the transmitting-receiving unit 301. In this exemplary embodiment, the image comparing unit 302 and the image defect determining unit 303 function as a detection section.

Figure 6:
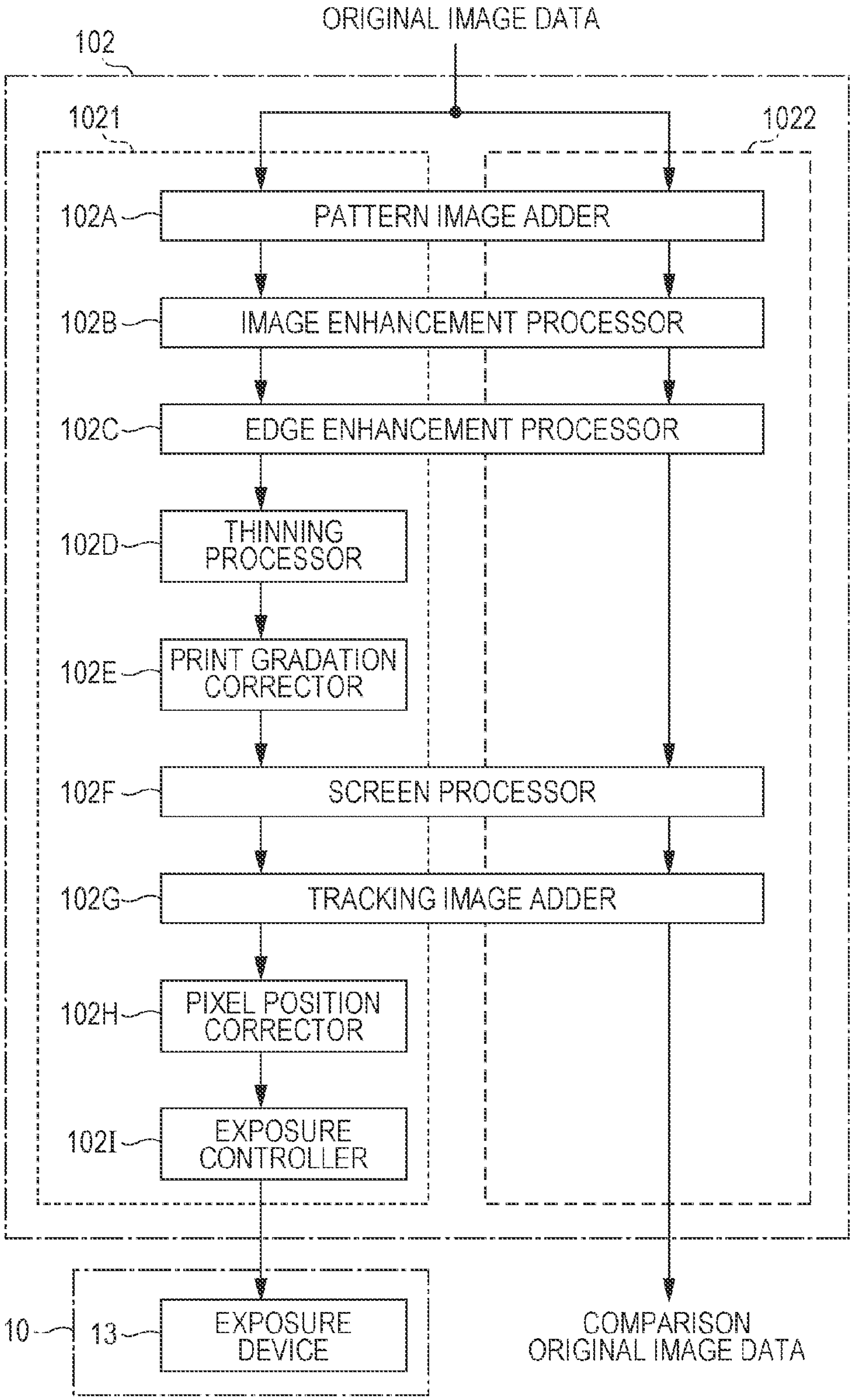
FIG. 6 is a block diagram illustrating a functional configuration of a print image processing unit according to a first exemplary embodiment.

FIG. 6 is a block diagram illustrating a functional configuration of the print image processing unit 102 of the controller 100 of the printer 1 illustrated in FIG. 4.

The print image processing unit 102 according to this exemplary embodiment includes a print-original-image creation module 1021 that creates print original image data on the basis of input original image data, and a comparison-original-image creation module 1022 that creates comparison original image data on the basis of the same original image data. The print original image data created by the print-original-image creation module 1021 is output to the exposure devices 13 included in the image forming section 10, whereas the comparison original image data created by the comparison-original-image creation module 1022 is output to the inspecting apparatus 3 (see FIG. 5) via the transmitting-receiving unit 101 (see FIG. 4).

The print image processing unit 102 also includes a pattern image adder 102A, an image enhancement processor 102B, an edge enhancement processor 102C, a thinning processor 102D, a print gradation corrector 102E, a screen processor 102F, a tracking image adder 102G, a pixel position corrector 102H, and an exposure controller 102I.

The print-original-image creation module 1021, which is an example of a first image creation section, includes the pattern image adder 102A, the image enhancement processor 102B, the edge enhancement processor 102C, the thinning processor 102D, the print gradation corrector 102E, the screen processor 102F, the tracking image adder 102G, the pixel position corrector 102H, and the exposure controller 102I as components thereof. On the other hand, the comparison-original-image creation module 1022, which is an example of a second image creation section, includes the pattern image adder 102A, the image enhancement processor 102B, the edge enhancement processor 102C, the screen processor 102F, and the tracking image adder 102G as components thereof.

Accordingly, in the print image processing unit 102, the pattern image adder 102A, the image enhancement processor 102B, the edge enhancement processor 102C, the screen processor 102F, and the tracking image adder 102G are components shared by the print-original-image creation module 1021 and the comparison-original-image creation module 1022. On the other hand, in the print image processing unit 102, the thinning processor 102D, the print gradation corrector 102E, the pixel position corrector 102H, and the exposure controller 102I are components unique to the print-original-image creation module 1021.

In this exemplary embodiment, the thinning processor 102D, the print gradation corrector 102E, the pixel position corrector 102H, and the exposure controller 102I that are unique to the print-original-image creation module 1021 are components that perform part of first image processing. Also, the pattern image adder 102A, the image enhancement processor 102B, the edge enhancement processor 102C, the screen processor 102F, and the tracking image adder 102G that are shared by the print-original-image creation module 1021 and the comparison-original-image creation module 1022 are components that perform second image processing.

Now, each component of the print image processing unit 102 according to this exemplary embodiment will be described.

The pattern image adder 102A adds pattern image data corresponding to a predetermined specific pattern image (e.g., rhombus or circle) to the input original image data by using a pattern generator (not illustrated) included in the printer 1, if necessary. A pattern image may be printed in a region in which an image based on the original image data may be printed and a region in which the image based on the original image data is not to be printed on the paper P.

The image enhancement processor 102B converts the set resolution (600 dpi in this example) of the image data input from the pattern image adder 102A into a higher output resolution (2400 dpi in this example) or adjusts pixel values of image data whose resolution has been increased, thereby performing image processing for smoothing edges of characters, curved lines, and so forth in a printed image (image enhancement processing).

The edge enhancement processor 102C adjusts some pixel values of the image data input from the image enhancement processor 102B or changes a screen to be used, thereby performing image processing for enhancing edges of halftone characters, lines, and so forth in the printed image (edge enhancement processing).

The thinning processor 102D adjusts some pixel values of the image data input from the edge enhancement processor 102C, thereby performing image processing for suppressing a state in which a thin line in the printed image becomes thicker than the intended width (thinning processing). A specific example of the thinning processing will be described later.

The print gradation corrector 102E performs image processing (print gradation correction) for making the relationship between the gradation value (input gradation value) of the image data input from the thinning processor 102D and the gradation value (output gradation value) of the image printed by the image forming section 10 linear. A specific example of the print gradation correction will be described later.

The screen processor 102F performs screen processing based on the set screen frequency and screen type, on the image data input from the print gradation corrector 102E or the edge enhancement processor 102C.

The tracking image adder 102G adds, as tracking image data, code image data including code information for identifying the source of the paper P having an image printed thereon (printed material), to the image data input from the screen processer 102F, if necessary. The code image used in this exemplary embodiment has a specific attribute so that the code image is recognizable as a code image when it is read with a sensor later. In this exemplary embodiment, the code image has an attribute that the code image is printed at predetermined intervals by using the colorant yellow. However, the code image is not limited to this particular example. For example, the code image may be embedded in the printed image created on the basis of the original image data by using a method in which screens of different types are used for a partial region and the other regions.

The pixel position corrector 102H performs correction for changing the position of each pixel in the image data input from the tracking image adder 102G, thereby suppressing distortion of a printed image due to the precision of the position exposed by the exposure devices 13. A specific example of the pixel position correction will be described later.

The exposure controller 102I adjusts exposure timing that varies due to the structure of the exposure devices 13, regarding the image data input from the pixel position corrector 102H. A specific example of the exposure control will be described later.

Now, the thinning processing, the print gradation correction, the pixel position correction, and the exposure control uniquely performed in the print-original-image creation module 1021 of the print image processing unit 102 will be described by using specific examples.

Figure 7A:
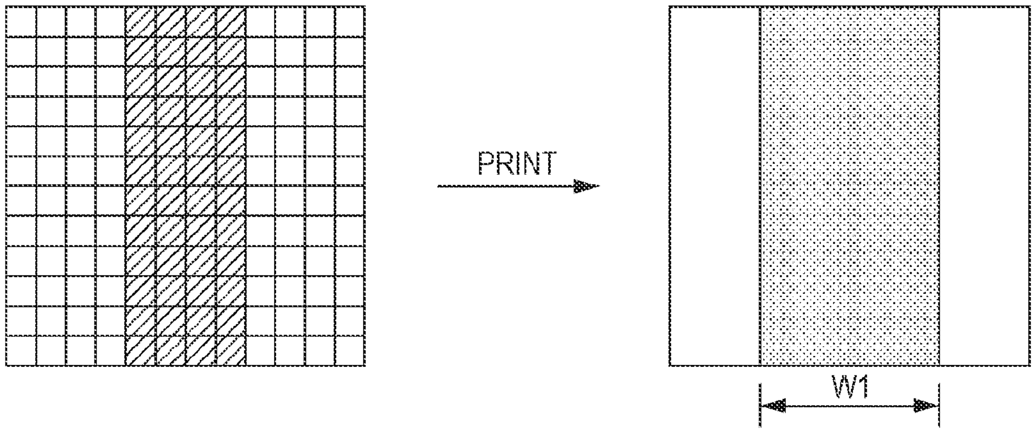
FIGS. 7A and 7B describe thinning processing performed in a print-original-image creation module.
Figure 7B:
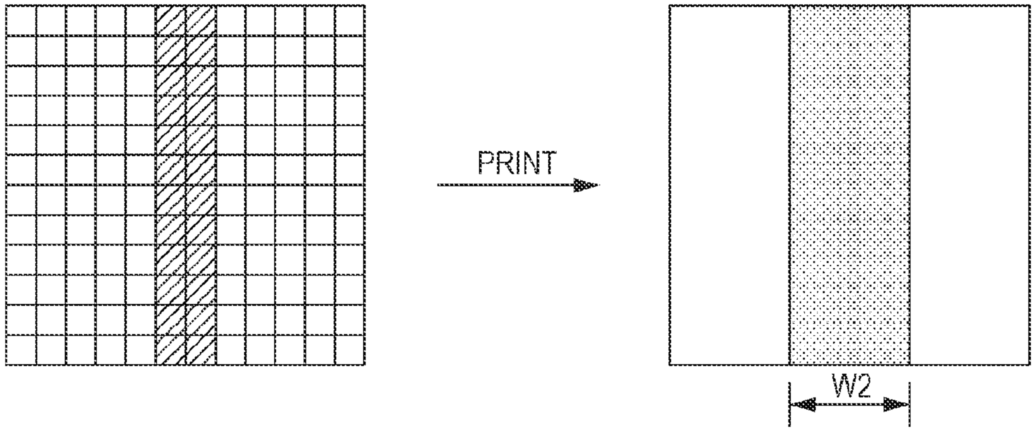

FIGS. 7A and 7B describe the thinning processing performed by the print-original-image creation module 1021 (more specifically, the thinning processor 102D).

FIG. 7A illustrates a relationship between an example of image data that is to undergo the thinning processing (left in the figure) and a printed image obtained on the basis of this image data that is to undergo the thinning processing (right in the figure). FIG. 7B illustrates a relationship between image data having undergone the thinning processing obtained by performing the thinning processing on the image data that is to undergo the thinning processing illustrated in FIG. 7A (left in the figure) and a printed image obtained on the basis of the image data having undergone the thinning processing (right in the figure).

When the printer 1 according to this exemplary embodiment prints, for example, a small character image (constituted by thin lines), the printed character image may be distorted. As a result, it may be difficult to distinguish the content of the printed image. Reasons for this circumstance include blurring caused when the photoconductor drums 11 are exposed by the exposure devices 13, and distortion of toner images caused in the transfer process (the first transfer and the second transfer in this example) and the fixing process.

Accordingly, for example as illustrated in FIG. 7A, the width of a thin line becomes a first width W1 that is wider than the intended width (which is close to a second width W2 to be described later) in a printed image obtained on the basis of the image data that is to undergo the thinning processing. In contrast, for example as illustrated in FIG. 7B, the width of the line becomes the second width W2, which is close to the intended width, in a printed image obtained on the basis of the image data having undergone the thinning processing. Accordingly, in this exemplary embodiment, the above-described thinning processing is performed by the thinning processor 102D on a line image (thin line image) including a line that is narrower than a predetermined width, whereby a decrease in the distinguishability of the content of the printed image is suppressed.

Figure 8A:
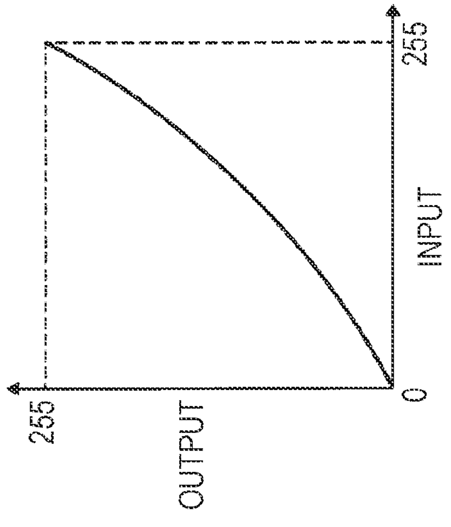
FIGS. 8A to 8C describe print gradation correction performed in the print-original-image creation module.
Figure 8B:
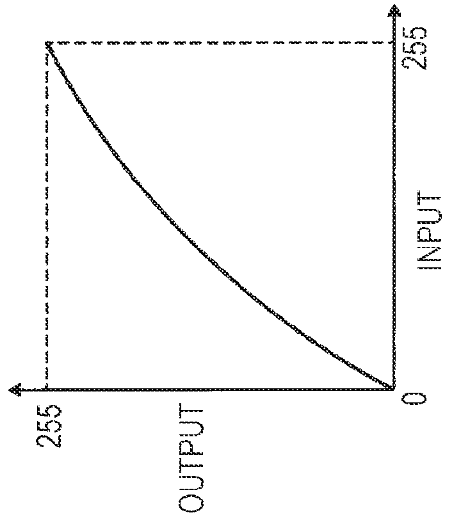
Figure 8C:
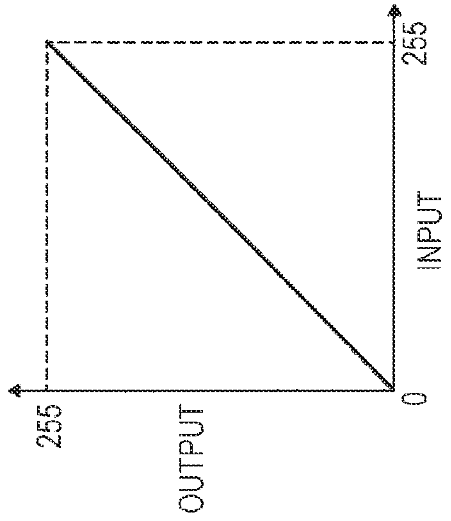

FIGS. 8A to 8C describe print gradation correction performed in the print-original-image creation module 1021 (more specifically, the print gradation corrector 102E).

FIG. 8A illustrates input-output characteristics (gradation) of the image forming section 10 according to this exemplary embodiment. FIG. 8B illustrates print gradation correction data (tone curve) obtained on the basis of the input-output characteristics illustrated in FIG. 8A. FIG. 8C illustrates input-output characteristics of a printed image obtained by correcting the input-output characteristics of the image forming section 10 illustrated in FIG. 8A by using the print gradation correction data illustrated in FIG. 8B. In this example, a value of each pixel is represented in 256 gradation levels (8 bits).

In the printer 1 according to this exemplary embodiment, each component of the image forming section 10 has unique input-output characteristics (gradation characteristics). For this reason, the input gradation value and the output gradation value have a non-linear relationship. As a result, a difference may be caused between the gradation (density) specified in the original image data and the gradation (density) actually obtained in the printed image. For example, the input-output characteristics illustrated in FIG. 8C, i.e., the linear relationship between the input gradation value and the output gradation value, is obtained by correcting the input-output characteristics illustrated in FIG. 8A by using the print gradation correction data illustrated in FIG. 8B that has the characteristics opposite to those illustrated in FIG. 8A. Thus, in this exemplary embodiment, print gradation correction is performed by the print gradation corrector 102E, whereby a difference between the gradation in the original image and the gradation in the printed image is reduced.

Figure 9A:
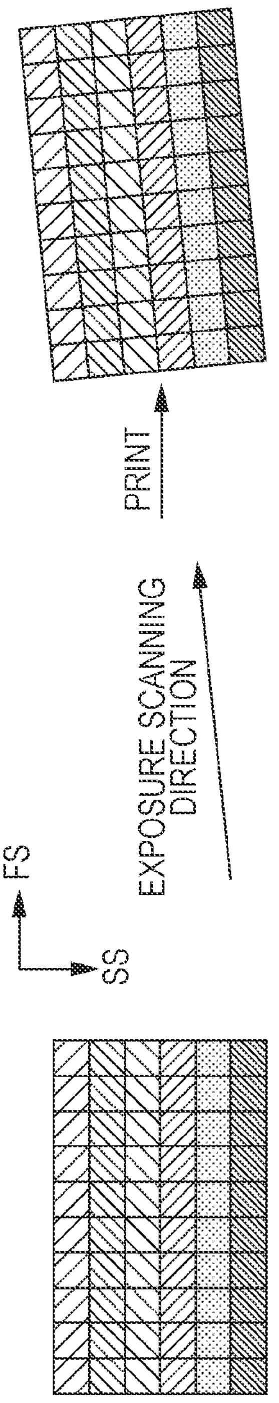
FIGS. 9A and 9B describe pixel position correction performed in the print-original-image creation module.
Figure 9B:
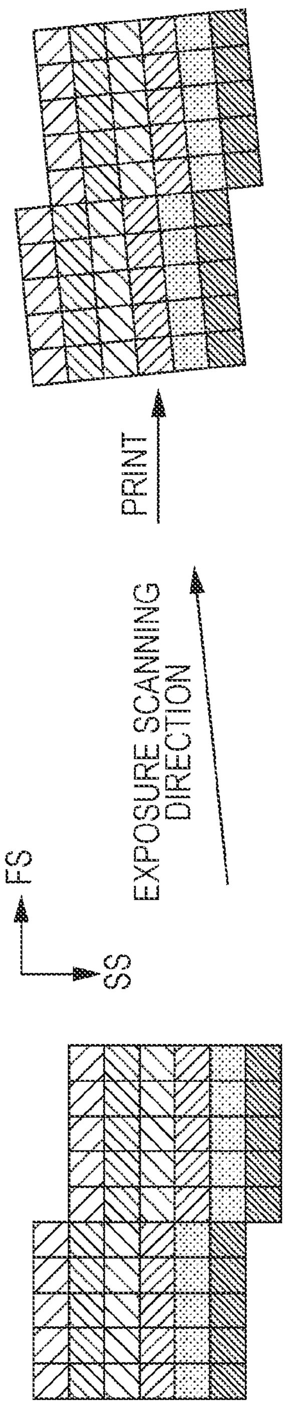

FIGS. 9A and 9B describe pixel position correction performed by the print-original-image creation module 1021 (more specifically, the pixel position corrector 102H).

FIG. 9A illustrates a relationship between image data that is to undergo pixel position correction (left in the figure), the exposure scanning direction of the exposure device 13 relative to a main scanning direction FS and a sub scanning direction (middle in the figure), and an electrostatic latent image formed on the photoconductor drum 11 (right in the figure). Also, FIG. 9B illustrates a relationship between image data having undergone pixel position correction obtained by performing pixel position correction on the image data that is to undergo the pixel position correction illustrated in FIG. 9A (left in the figure), the exposure scanning direction of the exposure device 13 relative to the main scanning direction FS and the sub scanning direction SS (middle in the figure), and an electrostatic latent image formed on the photoconductor drum 11 (right in the figure). It is assumed that the exposure scanning direction of the exposure device 13 is tilted relative to the main scanning direction FS at the same angle in FIGS. 9A and 9B.

In the printer 1 that adopts the electrophotography, the electrostatic latent image formed on the photoconductor drum 11 is distorted unless the light for one line in the main scanning direction FS output from the exposure device 13 is parallel to the axial direction of the photoconductor drum 11. For example, suppose that the light for one line in the main scanning direction FS is tilted relative to the axial direction of the photoconductor drum 11. In this case, even if it is attempted to form a straight line image in parallel to the main scanning direction FS, the electrostatic latent image actually formed is tilted in the sub scanning direction SS. Suppose that the light for one line in the main scanning direction FS is curved in an arrow-like shape in the axial direction of the photoconductor drum 11. In this case, even if it is attempted to form a straight line image in parallel to the main scanning direction FS, the electrostatic latent image actually formed is curved in the sub scanning direction SS. When the electrostatic latent image formed on the photoconductor drum 11 is distorted in the sub scanning direction SS, a toner image (printed image) formed by developing the electrostatic latent image is also distorted in the sub scanning direction SS. The distortion in the sub scanning direction SS due to the former case is generally referred to as skew, whereas the distortion in the sub scanning direction SS due to the latter case is generally referred to as bow. Accordingly, FIGS. 9A and 9B illustrate a case in which skew is caused.

For example as illustrated in FIG. 9A, the tilt of the image stands out in the electrostatic latent image (printed image) obtained from the image data that is to undergo pixel position correction. In contrast, for example as illustrated in FIG. 9B, the tilt of the image is less likely to stand out in the printed image obtained from the image data having undergone pixel position correction than in the electrostatic latent image (printed image) illustrated in FIG. 9A. Here, the image data having undergone pixel position correction is obtained by dividing image data for each line in the main scanning direction FS, among the image data that is to undergo pixel position correction illustrated in FIG. 9A, into multiple blocks (two in this example), and shifting the divided blocks of the image data in the sub scanning direction SS. In this exemplary embodiment, displacement of pixels due to the incorrect exposure scanning direction of the exposure device 13 is suppressed by performing the pixel position correction in the pixel position corrector 102H.

FIGS. 10A to 10D describe exposure control performed by the print-original-image creation module 1021 (more specifically, the exposure controller 102I).

Figure 10D:
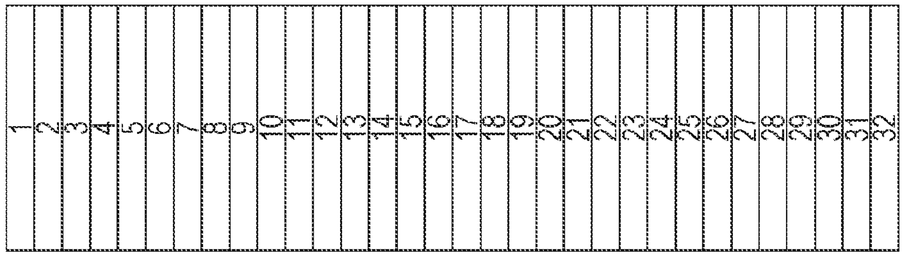
FIGS. 10A to 10D describe exposure control performed in the print-original-image creation module.
Figure 10C:
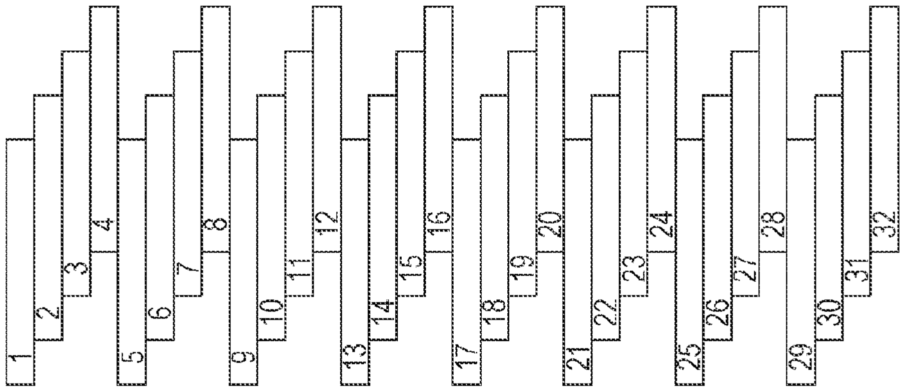
Figure 10B:
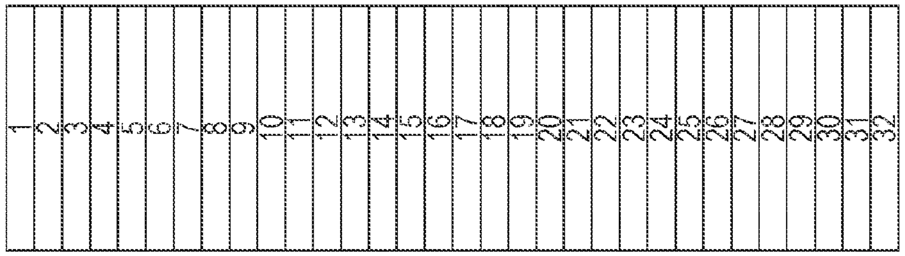
Figure 10A:
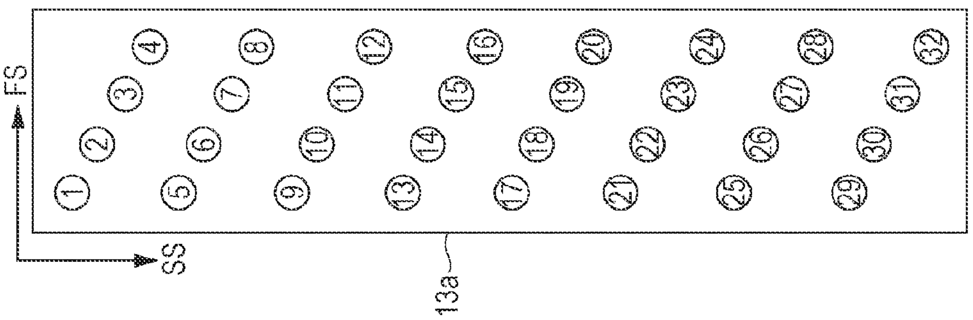

FIG. 10A illustrates a configuration of a vertical cavity surface emitting laser (VCSEL) that outputs multiple laser beams in the exposure device 13 (see FIG. 2). FIG. 10B illustrates image data obtained before exposure timings are corrected by the exposure controller 102I. FIG. 10C illustrates image data obtained after exposure timings are corrected by the exposure controller 102I. FIG. 10D illustrates an electrostatic latent image formed on the photoconductive drum 11 by exposing the photoconductor drum 11 with light based on the image data resulting from the exposure timing correction illustrated in FIG. 10C using the VCSEL 13*a* illustrated in FIG. 10A.

First, the configuration of the VCSEL 13*a* will be described with reference to FIG. 10A.

The VCSEL 13*a* according to this embodiment includes 32 laser diodes, which are arranged on a substrate (without a reference number) so as to be disposed in different rows in the main scanning direction FS. In the following description, the laser diode located on the most upstream side in the sub scanning direction SS is called a first diode, whereas the laser diode located on the most downstream side in the sub scanning direction SS is called a thirty-second diode. In the VCSEL 13*a*, the first, fifth, ninth, thirteenth, seventeenth, twenty-first, twenty-fifth, and twenty-ninth laser diodes are arranged in the same column in the sub scanning direction SS (called a first column); the second, sixth, tenth, fourteenth, eighteenth, twenty-second, twenty-sixth, and thirtieth laser diodes are arranged in the same column in the sub scanning direction SS (called a second column); the third, seventh, eleventh, fifteenth, nineteenth, twenty-third, twenty-seventh, and thirty-first laser diodes are arranged in the same column in the sub scanning direction SS (called a third column); and the fourth, eighth, twelfth, sixteenth, twentieth, twenty-fourth, twenty-eighth, and thirty-second laser diodes are arranged in the same column in the sub scanning direction SS (called a fourth column).

In the example illustrated in FIG. 10B, pieces of image data that are to undergo exposure timing correction exist for the first to thirty-second lines in the sub scanning direction SS. Here, the image data for the first line in the sub scanning direction SS is supplied to the first laser diode, whereas the image data for the thirty-second line in the sub scanning direction SS is supplied to the thirty-second laser diode. In this exemplary embodiment, the laser diodes in the first to fourth columns in the VCSEL 13*a* illustrated in FIG. 10A are arranged to be shifted from one another in the main scanning direction FS. If the image data on which exposure timing correction has not been performed illustrated in FIG. 10B is supplied to this VCSEL 13*a* without any processing, the position of the main scanning direction FS is shifted on a column-by-column basis in the obtained electrostatic latent image (printed image). In contrast, as illustrated in FIG. 10C, when exposure-timing-corrected image data is used which is obtained by performing correction for shifting the exposure start timing in accordance with the layout of the laser diodes on the exposure-timing-uncorrected image data illustrated in FIG. 10B for each line in the main scanning direction FS, the resulting electrostatic latent image (printed image) is free from the displacement in the main scanning direction FS for each column as illustrated in FIG. 10D. Accordingly, in this exemplary embodiment, displacement of an image due to the layout of multiple laser diodes included in the exposure device 13 is suppressed by performing exposure control (exposure timing correction) in the exposure controller 102I.

In the exposure control, light quantity correction for suppressing variations in the light quantities due to variations in the current-output (light quantity) characteristics of the laser diodes of the VCSEL 13*a* is also performed in addition to the exposure timing correction described above.

Figure 11:
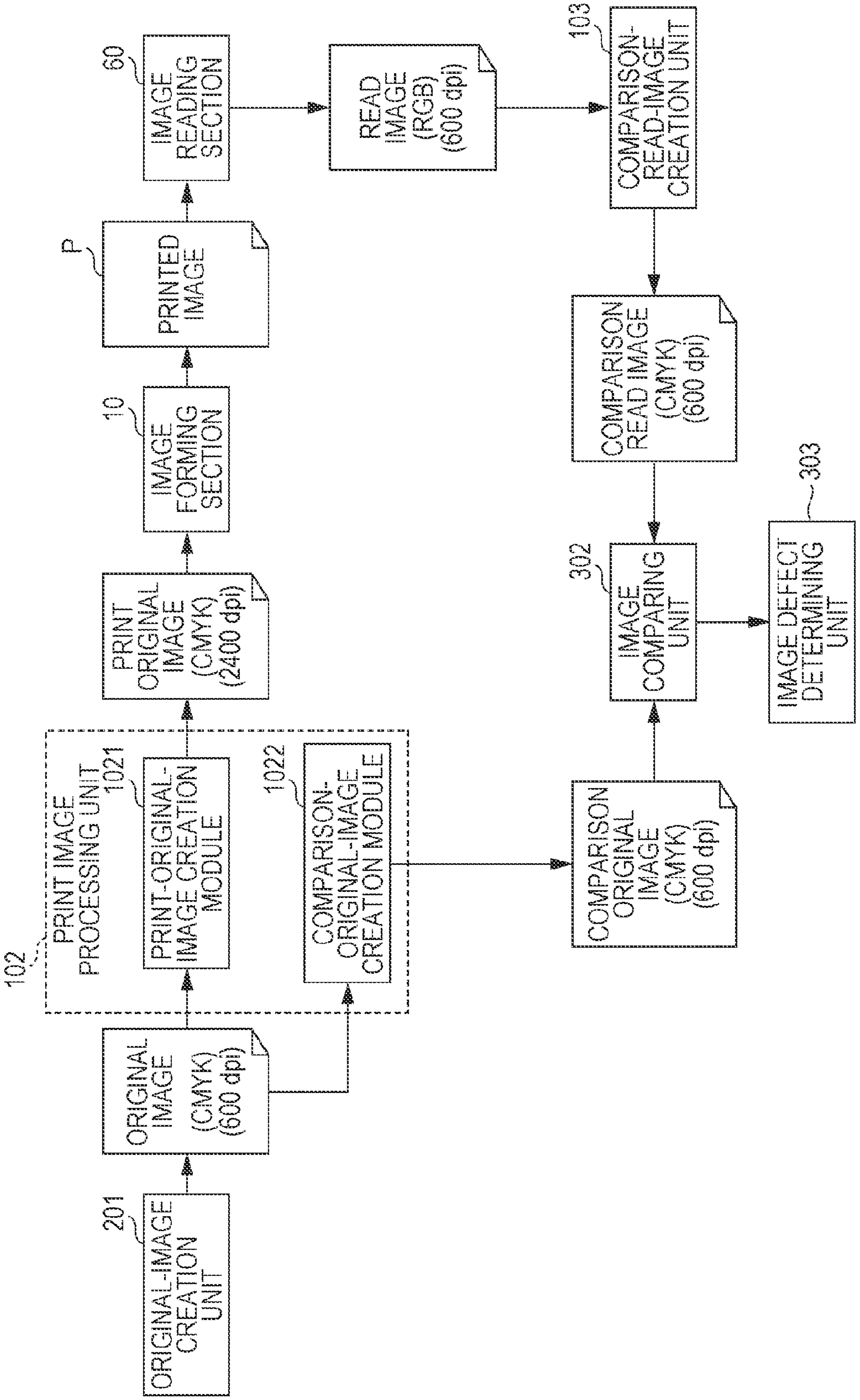
FIG. 11 describes a printing and inspecting procedure performed in the printing system according to the first exemplary embodiment.

FIG. 11 describes a printing and inspecting procedure performed in the printing system according to this exemplary embodiment. Operations of the apparatuses constituting the printing system and data exchange performed between the apparatuses will be described below in accordance with FIG. 11.

The original-image creation unit 201 of the setting apparatus 2 creates original image data (represented in the set color space (CMYK in this example) and having the set resolution (600 dpi in this example)). The resulting original image data is input to the print image processing unit 102 of the printer 1. In response to this input, in the print image processing unit 102, the print-original-image creation module 1021 creates print original image data (represented in the output color space (CMYK in this example) and having the output resolution (2400 dpi in this example)) on the basis of the original image data (CMYK, 600 dpi), and the comparison-original-image creation module 1022 creates comparison original image data (represented in the inspection color space (CMYK in this example) and having the inspection resolution (600 dpi in this example)) on the basis of the same original image data (CMYK, 600 dpi).

Next, in the printer 1, the print original image data (CMYK, 2400 dpi) having been created by the print-original-image creation module 1021 of the print image processing unit 102 is input to the image forming section 10 (more specifically, the exposure devices 13). In response to this input, the image forming section 10 prints an image in colors of cyan, magenta, yellow, and black on the paper P. Subsequently, the image reading section 60 of the printer 1 reads the printed image on this paper P. The image reading section 60 then creates read image data (represented in the input color space (RGB in this example) and having the input resolution (600 dpi in this example)) on the basis of results of the reading performed by using three line sensors.

Furthermore, in the printer 1, the read image data (RGB, 600 dpi) having been created by the image reading section 60 is input to the comparison-read-image creation unit 103. In response to this input, the comparison-read-image creation unit 103 creates comparison read image data (represented in the inspection color space (CMYK in this example) and having the inspection resolution (600 dpi in this example)) on the basis of the read image data (RGB, 600 dpi).

Subsequently, in the inspecting apparatus 3, the comparison original image data (output from the comparison-original-image creation module 1022 of the print image processing unit 102) and the comparison read image data (output from the comparison-read-image creation unit 103), which are obtained from the same original image data, are input to the image comparing unit 302. In response to this input, the image comparing unit 302 compares the comparison original image data (CMYK, 600 dpi) with the comparison read image data (CMYK, 600 dpi) on a pixel-by-pixel basis. Examples of the comparison method used by the image comparing unit 302 may include determining a difference between pixel values of pixels located at corresponding positions in the two-dimensional coordinates, for each pair of corresponding pixels of the comparison original image data and the comparison read image data.

Then, in the inspecting apparatus 3, a result of the comparison performed by the image comparing unit 302 is input to the image defect determining unit 303. In response to this input, the image defect determining unit 303 determines whether or not there is a defect in the printed image that has been printed on the paper P on the basis of the original image data, by using this comparison result. Examples of the method for determining an image defect used by the image defect determining unit 303 may include detecting occurrence of an image defect if the magnitude of the difference included in the comparison result is greater than a predetermined reference value. If occurrence of an image defect is detected, this determination result is transmitted to the setting apparatus 2. Then, in the setting apparatus 2, an image for informing a user of occurrence of an image defect is displayed on the UI 202 (see FIG. 3).

Now, a process performed by the print image processing unit 102 in the printing and inspecting procedure according to this exemplary embodiment will be described with reference to FIG. 6. The following description is regarding an example case in which the print image processing unit 102 creates the print original image data and the comparison original image data by adding both the pattern image data and the tracking image data to the original image data.

First, a procedure will be described in which the print-original-image creation module 1021 creates the print original image data on the basis of the original image data.

In the print-original-image creation module 1021, the original image data is input to the pattern image adder 102A. The original image data then undergoes the pattern-image-data addition processing performed by the pattern image adder 102A, the image enhancement processing performed by the image enhancement processor 102B, and the edge enhancement processing performed by the edge enhancement processor 102C.

The original image data having undergone the edge enhancement processing then undergoes the thinning processing (see FIGS. 7A and 7B) performed by the thinning processor 102D and the print gradation correction (see FIGS. 8A to 8C) performed by the print gradation corrector 102E. The original image data having undergone the print gradation correction then undergoes the screen processing performed by the screen processor 102F and the tracking-image-data addition processing performed by the tracking image adder 102G.

The original image data having undergone the tracking-image-data addition processing then undergoes the pixel position correction (see FIGS. 9A and 9B) performed by the pixel position corrector 102H and the exposure control (exposure timing correction, see FIGS. 10A to 10D) performed by the exposure controller 102I. As a result, the print original image data obtained by performing various kinds of image processing on the original image data is output to the exposure devices 13 of the image forming section 10 from the exposure controller 102I.

Subsequently, a procedure will be described in which the comparison-original-image creation module 1022 creates the comparison original image data on the basis of the original image data.

In the comparison-original-image creation module 1022, the original image data is input to the pattern image adder 102A. The original image data then undergoes the pattern-image-data addition processing performed by the pattern image adder 102A, the image enhancement processing performed by the image enhancement processor 102B, and the edge enhancement processing performed by the edge enhancement processor 102C. The procedure performed so far is the same as the above-described procedure of creating the print original image data.

The original image data having undergone the edge enhancement processing then undergoes the screen processing performed by the screen processor 102F and the tracking-image-data addition processing performed by the tracking image adder 102G. Then, the comparison original image data obtained by performing various kinds of image processing on the original image data is output to the inspecting apparatus 3 from the tracking image adder 102G via the transmitting-receiving unit 101.

If the printer 1 according to this exemplary embodiment prints an image on the paper P by using original image data as it is, the printer 1 may be incapable of accurately reproducing the content of the original image data in the printed image because of the characteristics unique to the image forming section 10 (particularly, the exposure devices 13). Accordingly, in this exemplary embodiment, the print original image data is created by performing the above-described thinning processing, print gradation correction, pixel position correction, and exposure control (hereinafter, referred to as printing unique processing) on the original image data, and an image is printed on the paper P by using the obtained print original image data. On the other hand, if the above-described printing unique processing is performed when the comparison original image data is created from the original image data, the resulting comparison original image data includes unnecessary modifications. Accordingly, in comparison of the comparison read image data obtained by reading a printed image based on the print original image data having undergone the printing unique processing with the comparison original image data having undergone the printing unique processing, an image defect may be determined erroneously because of the printing unique processing having been performed on the comparison original image data even if the content of the original image data is accurately reproduced in the printed image.

However, in this exemplary embodiment, the above-described printing unique processing is performed when the print original image data is created from the original image data but is not performed when the comparison original image data is created from the original image data.

Second Exemplary Embodiment

In the first exemplary embodiment, the same type of screen processing is performed by using the common screen processor 102F when print original image data and comparison original image data are created in the print image processing unit 102. In contrast, in this exemplary embodiment, the fact that the output resolution (2400 dpi in this example) of the print original image data differs from the inspection resolution (600 dpi in this example) of the comparison original image data is focused on, and the print original image data and the comparison original image data are created by performing different types of screen processing. In this exemplary embodiment, components that are the same as those described in the first exemplary embodiment are assigned the same references and the detailed description thereof are omitted.

Figure 12:
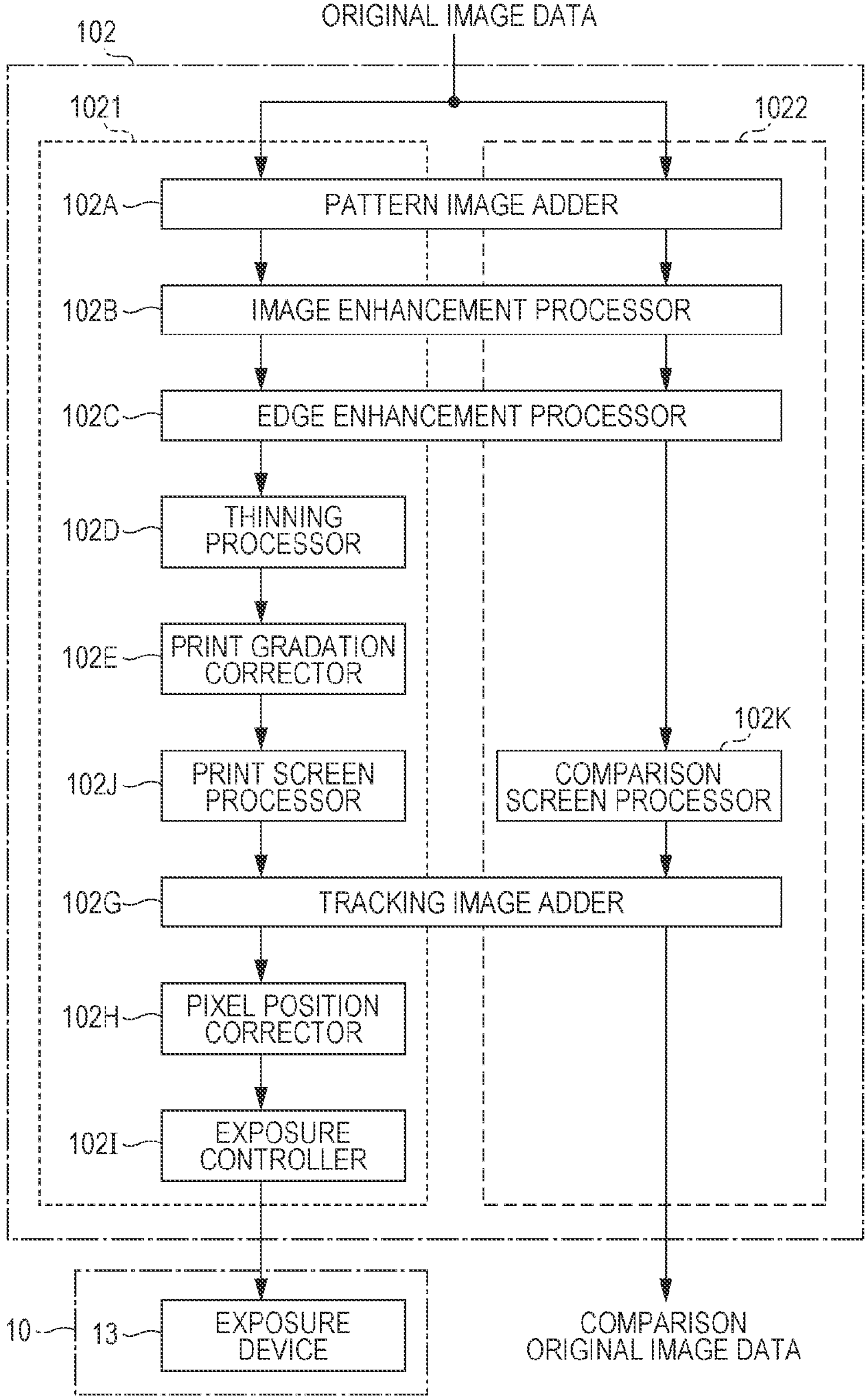
FIG. 12 is a block diagram illustrating a functional configuration of a print image processing unit according to a second exemplary embodiment.

FIG. 12 is a block diagram illustrating a functional configuration of the print image processing unit 102 according to this exemplary embodiment.

The print image processing unit 102 according to this exemplary embodiment includes a print-original-image creation module 1021 that creates print original image data on the basis of input original image data, and a comparison original image creation module 1022 that creates comparison original image data on the basis of the same original image data.

The print image processing unit 102 also includes a pattern image adder 102A, an image enhancement processor 102B, an edge enhancement processor 102C, a thinning processor 102D, a print gradation corrector 102E, a print screen processor 102J, a comparison screen processor 102K, a tracking image adder 102G, a pixel position corrector 102H, and an exposure controller 102I. That is, the print image processing unit 102 according to this exemplary embodiment includes the print screen processor 102J and the comparison screen processor 102K instead of the screen processor 102F, which is different from the first exemplary embodiment.

The print-original-image creation module 1021 includes the pattern image adder 102A, the image enhancement processor 102B, the edge enhancement processor 102C, the thinning processor 102D, the print gradation corrector 102E, the print screen processor 102J, the tracking image adder 102G, the pixel position corrector 102H, and the exposure controller 102I as components thereof. On the other hand, the comparison-original-image creation module 1022 includes the pattern image adder 102A, the image enhancement processor 102B, the edge enhancement processor 102C, the comparison screen processor 102K, and the tracking image adder 102G as components thereof.

Accordingly, in the print image processing unit 102 according to this exemplary embodiment, the pattern image adder 102A, the image enhancement processor 102B, the edge enhancement processor 102C, and the tracking image adder 102G are components shared by the print-original-image creation module 1021 and the comparison-original-image creation module 1022. On the other hand, in the print image processing unit 102, the thinning processor 102D, the print gradation corrector 102E, the print screen processor 102J, the pixel position corrector 102H, and the exposure controller 102I are components unique to the print-original-image creation module 1021. Also, in the print image processing unit 102, the comparison screen processor 102K is a component unique to the comparison-original-image creation module 1022.

In this exemplary embodiment, the thinning processor 102D, the print gradation corrector 102E, the print screen processor 102J, the pixel position corrector 102H, and the exposure controller 102I that are unique to the print-original-image creation module 1021 are components that perform part of first image processing. Also, the pattern image adder 102A, the image enhancement processor 102B, the edge enhancement processor 102C, and the tracking image adder 102G that are shared by the print-original-image creation module 1021 and the comparison-original-image creation module 1022 and the comparison screen processor 102K that is unique to the comparison-original-image creation module 1022 are components that perform second image processing.

The print screen processor 102J of the print-original-image creation module 1021 performs print screen processing on the image data input from the print gradation corrector 102E, and outputs the resulting image data to the tracking image adder 102G. On the other hand, the comparison screen processor 102K of the comparison-original-image creation module 1022 performs comparison screen processing on image data input from the edge enhancement processor 102C, and outputs the resulting image data to the tracking image adder 102G. The print screen processor 102J has the same functions as the screen processor 102F described in the first exemplary embodiment. In contrast, the comparison screen processor 102 has functions different from those of the screen processor 102F.

Figure 13:
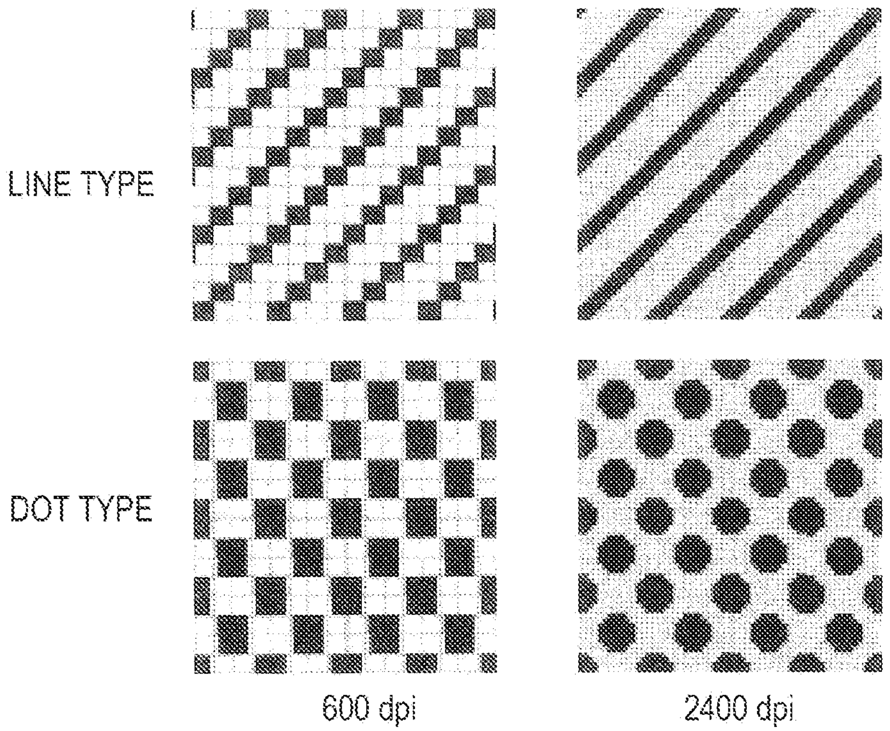
FIG. 13 describes an example of print screen processing performed in a print-original-image creation module and comparison screen processing performed in a comparison-original-image creation module.

FIG. 13 describes an example of the print screen processing performed by the print-original-image creation module 1021 (more specifically, the print screen processor 102J) and the comparison screen processing performed by the comparison-original-image creation module 1022 (more specifically, the comparison screen processor 102K).

FIG. 13 illustrates four images obtained by performing different types of screen processing on the same image data having a uniform gradation (density). Two images located in the upper part of FIG. 13 are examples of images obtained when line-type screens are adopted in screen processing, whereas two images located in the lower part of FIG. 13 are examples of images obtained when dot-type screens are adopted in screen processing. Also, the two images located on the left side of FIG. 13 are images having a resolution of 600 dpi, whereas the two images located on the right side of FIG. 13 are images having a resolution of 2400 dpi. In this example, the same screen frequency is used in the screen processing for the resolution of 600 dpi and the resolution of 2400 dpi. The comparison of the image having the resolution of 600 dpi with the image having the resolution of 2400 dpi indicates that jaggedness of pixels is less likely to stand out in the image having the resolution of 2400 dpi.

In this exemplary embodiment, the print screen processor 102J of the print-original-image creation module 1021 performs screen processing at the resolution of 2400 dpi illustrated on the right side of FIG. 13 during creation of the print original image data. In contrast, the comparison screen processor 102K of the comparison-original-image creation module 1022 performs screen processing at the resolution of 600 dpi illustrated on the left side of FIG. 13 during creation of the comparison original image data. Here, it is assumed that the screen frequencies used in the print screen processing and the comparison screen processing are the same (e.g., 200 lines per inch) and the screen types used in the print screen processing and the comparison screen processing are also the same (e.g., the line type).

The printing and inspecting procedure performed by a printing system according to this exemplary embodiment is generally the same as that according to the first exemplary embodiment (see FIG. 11), and thus the detailed description thereof is omitted.

Now, a process performed by the print image processing unit 102 in the printing and inspecting procedure according to this exemplary embodiment will be described with reference to FIG. 12. The following description is regarding an example case in which the print image processing unit 102 creates the print original image data and the comparison original image data by adding both the pattern image data and the tracking image data to the original image data.

First, a procedure will be described in which the print-original-image creation module 1021 creates the print original image data on the basis of the original image data.

In the print-original-image creation module 1021, the original image data is input to the pattern image adder 102A. The original image data then undergoes the pattern-image-data addition processing performed by the pattern image adder 102A, the image enhancement processing performed by the image enhancement processor 102B, and the edge enhancement processing performed by the edge enhancement processor 102C.

The original image data having undergone the edge enhancement processing then undergoes the thinning processing (see FIGS. 7A and 7B) performed by the thinning processor 102D and the print gradation correction (see FIGS. 8A to 8C) performed by the print gradation corrector 102E. The original image data having undergone the print gradation correction then undergoes the print screen processing (see the right side of FIG. 13) performed by the print screen processor 102J and the tracking-image-data addition processing performed by the tracking image adder 102G.

The original image data having undergone the tracking-image-data addition processing then undergoes the pixel position correction (see FIGS. 9A and 9B) performed by the pixel position corrector 102H and the exposure control (exposure timing correction, see FIGS. 10A to 10D) performed by the exposure controller 102I. Subsequently, the print original image data obtained by performing various kinds of image processing on the original image data is output to the exposure devices 13 of the image forming section 10 from the exposure controller 102I.

Now, a procedure will be described in which the comparison-original-image creation module 1022 creates the comparison original image data on the basis of the original image data.

In the comparison-original-image creation module 1022, the original image data is input to the pattern image adder 102A. The original image data then undergoes the pattern-image-data addition processing performed by the pattern image adder 102A, the image enhancement processing performed by the image enhancement processor 102B, and the edge enhancement processing performed by the edge enhancement processor 102C. The procedure performed so far is the same as the above-described process of creating the print original image data.

The original image data having undergone the edge enhancement processing then undergoes the comparison screen processing (see the left side of FIG. 13) performed by the comparison screen processor 102K and the tracking-image-data addition processing performed by the tracking image adder 102G. Subsequently, the comparison original image data obtained by performing various kinds of image processing on the original image data is output to the inspecting apparatus 3 from the tracking image adder 102G via the transmitting-receiving unit 101.

In this exemplary embodiment, the image reading section 60 creates read image data having the input resolution (600 dpi). That is, even if the image forming section 10 prints an image on the paper P at the output resolution of 2400 dpi, the image reading section 60 is only capable of creating the read image data having the input resolution of 600 dpi. For this reason, the screen structure of the printed image corresponding to the 2400 dpi is read by the image reading section 600 substantially as a screen structure corresponding to 600 dpi.

Also in this exemplary embodiment, the comparison-read-image creation unit 103 creates comparison read image data based on the read image data at the inspection resolution (600 dpi), which is equal to the input resolution. For this reason, the screen structure corresponding to 600 dpi also exists in the comparison read image data. Thus, the inspecting apparatus 3 performs inspection by comparing the comparison read image data substantially having the screen structure of 600 dpi with the comparison original image data.

Accordingly, in this exemplary embodiment, the resolution in the screen processing (comparison screen processing) performed during creation of the comparison original image data is set lower than the resolution in the screen processing (print screen processing) performed during creation of the print original image data. More specifically, in this exemplary embodiment, the resolution in the print screen processing is set equal to the output resolution used in the image forming section 10, whereas the resolution in the comparison screen processing is set equal to the inspection resolution (=the input resolution), which is lower than the output resolution.

Third Exemplary Embodiment

In the first exemplary embodiment, the print original image data and the comparison original image data are created in the printer 1 on the basis of the original image data created in the setting apparatus 2, and gradation correction (print gradation correction) for addressing the input-output characteristics of the image forming section 10 is performed during creation of the print original image data. In contrast, in this exemplary embodiment, the setting apparatus 2 performs gradation correction (set gradation correction to be described later) on the original image data in accordance with the type of the paper P on which printing is to be performed by the printer 1. Furthermore, the print gradation correction for addressing the input-output characteristics of the image forming section 10 is performed in the print-original-image creation module 1021 of the print image processing unit 102, whereas inverse correction (inverse set gradation correction to be described later) for cancelling the set gradation correction is performed by the comparison-original-image creation module 1022 of the print image processing unit 102. In this exemplary embodiment, components that are the same as those described in the first exemplary embodiment are assigned the same references and the detailed description thereof is omitted.

Figure 14:
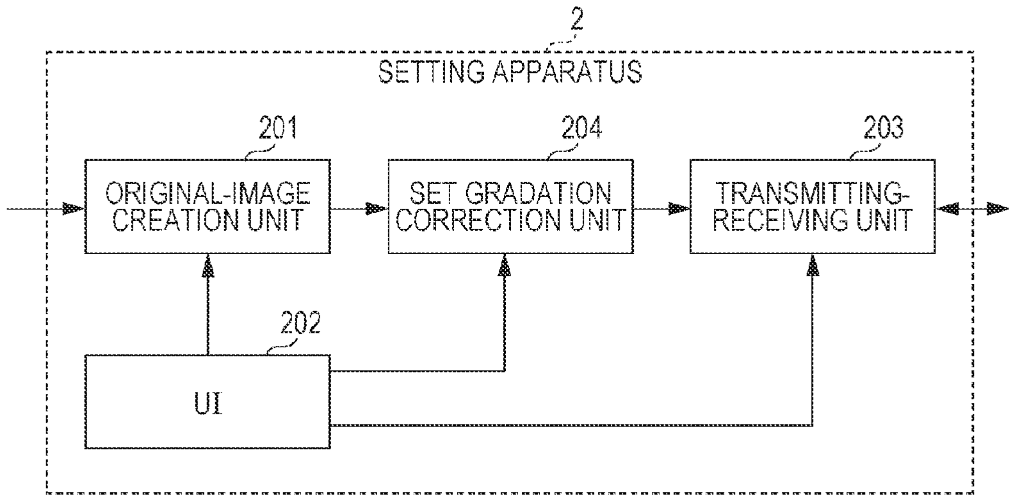
FIG. 14 is a block diagram illustrating a functional configuration of a setting apparatus according to a third exemplary embodiment.

FIG. 14 is a block diagram illustrating a functional configuration of the setting apparatus 2 according to this exemplary embodiment.

This setting apparatus 2 includes an original-image creation unit 201, a UI 202, a transmitting-receiving unit 203, and a set gradation correction unit 204. That is, the setting apparatus 2 according to this exemplary embodiment further includes the set gradation correction unit 204, which is different from the first exemplary embodiment.

The set gradation correction unit 204 according to this exemplary embodiment performs gradation correction (set gradation correction) for correcting the non-linear input-output characteristics due to the type of the paper P (such as weight, color, or texture) to be linear, on the basis of information on the type of the paper P on which an image is to be printed, the information being input via the UI 202 or the like. The set gradation correction unit 204 performs set gradation correction on the original image data (CMYK, 600 dpi) created by the original-image creation unit 201, thereby creating "corrected original image data". The color space of the corrected original image data is defined as the CMYK color space, which is the same as the set color space of the original image data. The resolution of the corrected original image data is set equal to the set resolution (600 dpi), which is equal to the resolution of the original image data.

Figure 15:
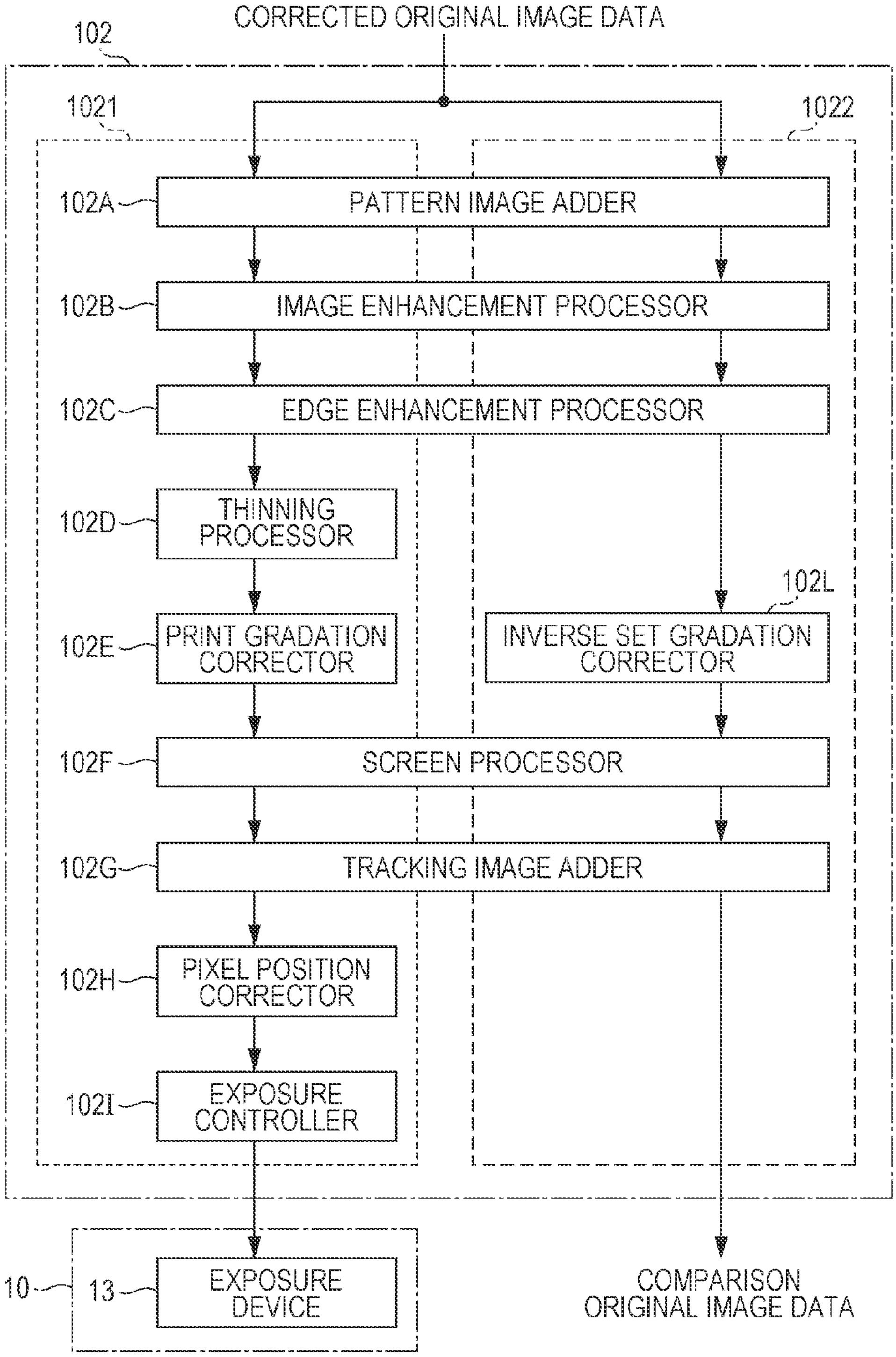
FIG. 15 is a block diagram illustrating a functional configuration of a print image processing unit according to the third exemplary embodiment.

FIG. 15 is a block diagram illustrating a functional configuration of the print image processing unit 102 according to this exemplary embodiment.

The print image processing unit 102 according to this exemplary embodiment includes a print-original-image creation module 1021 that creates print original image data on the basis of the input corrected original image data, and a comparison-original-image creation module 1022 that creates comparison original image data on the basis of the same corrected original image data.

The print image processing unit 102 also includes a pattern image adder 102A, an image enhancement processor 102B, an edge enhancement processor 102C, a thinning processor 102D, a print gradation corrector 102E, a screen processor 102F, a tracking image adder 102G, a pixel position corrector 102H, an exposure controller 102I, and an inverse set gradation corrector 102L. The print image processing unit 102 according to this exemplary embodiment receives the corrected original image data instead of the original image data and further includes the inverse set gradation corrector 102L, which is different from the first exemplary embodiment.

The print-original-image creation module 1021 includes the pattern image adder 102A, the image enhancement processor 102B, the edge enhancement processor 102C, the thinning processor 102D, the print gradation corrector 102E, the screen processor 102F, the tracking image adder 102G, the pixel position corrector 102H, and the exposure controller 102I as components thereof. On the other hand, the comparison-original-image creation module 1022 includes the pattern image adder 102A, the image enhancement processor 102B, the edge enhancement processor 102C, the inverse set gradation corrector 102L, the screen processor 102F, and the tracking image adder 102G as components thereof.

Accordingly, in the print image processing unit 102, the pattern image adder 102A, the image enhancement processor 102B, the edge enhancement processor 102C, the screen processor 102F, and the tracking image adder 102G are components that are shared by the print-original-image creation module 1021 and the comparison-original-image creation module 1022. On the other hand, in the print image processing unit 102, the thinning processor 102D, the print gradation corrector 102E, the pixel position corrector 102H, and the exposure controller 102I are components that are unique to the print-original-image creation module 1021. Also in the print image processing unit 102, the inverse set gradation corrector 102L is a component that is unique to the comparison-original-image creation module 1022.

In this exemplary embodiment, the thinning processor 102D, the print gradation corrector 102E, the pixel position corrector 102H, and the exposure controller 102I that are unique to the print-original-image creation module 1021 are components that perform part of first image processing. The pattern image adder 102A, the image enhancement processor 102B, the edge enhancement processor 102C, the screen processor 102F, and the tracking image adder 102G that are shared by the print-original-image creation module 1021 and the comparison-original-image creation module 1022, and the inverse set gradation corrector 102L that is unique to the comparison-original-image creation module 1022 are components that perform second image processing.

The inverse set gradation corrector 102L of the comparison-original-image creation module 1022 performs inverse gradation correction on the image data input from the edge enhancement processor 102C, and outputs the resulting image data to the screen processor 102F. The set gradation correction data having been used in the set gradation correction by the set gradation correction unit 204 (see FIG. 14) of the setting apparatus 2 is input to the inverse set gradation corrector 102L. The inverse set gradation corrector 102L then performs inverse set gradation correction on the image data by using inverse set gradation correction data obtained by inversing the acquired set gradation correction data.

Figure 16:
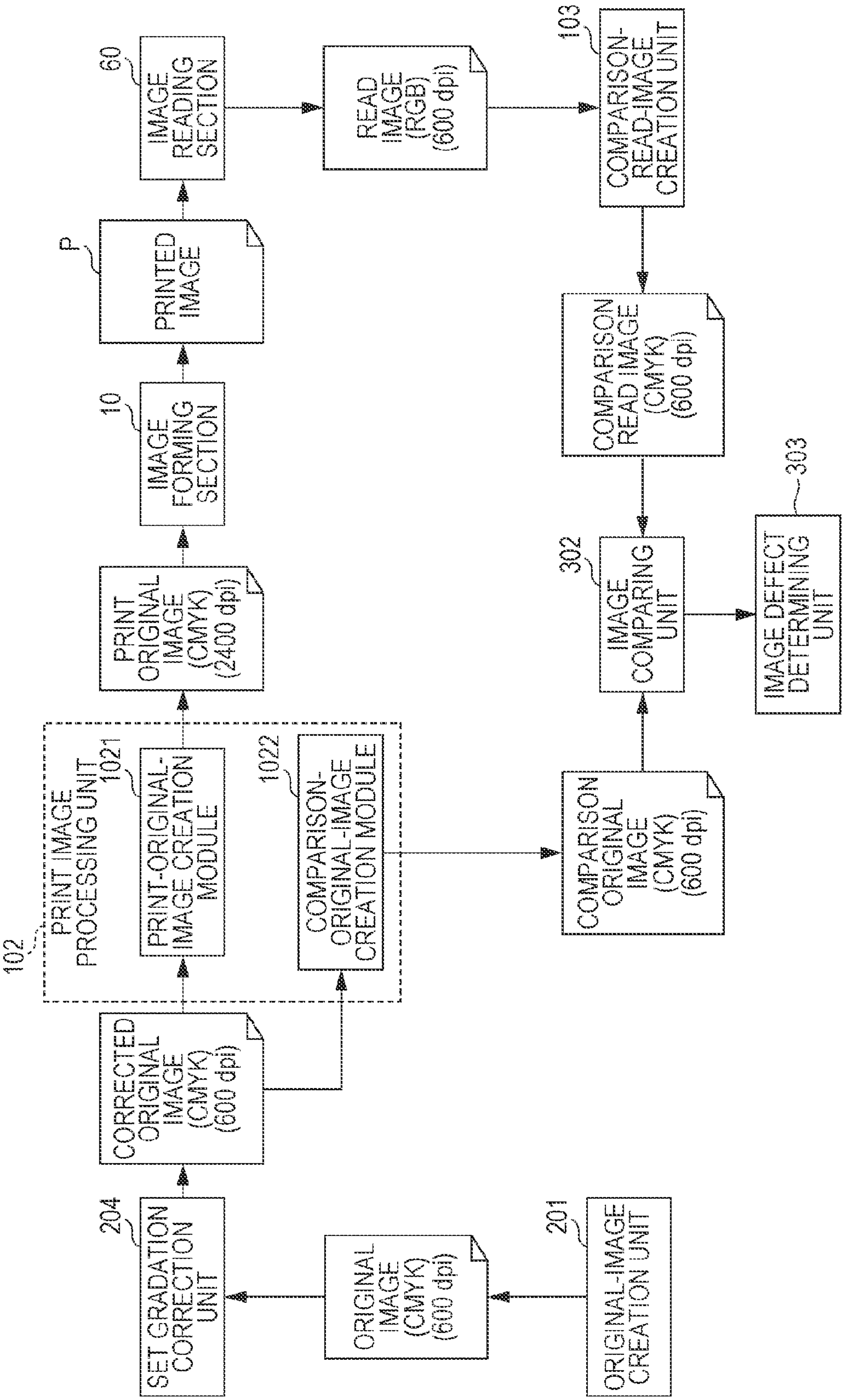
FIG. 16 describes a printing and inspecting procedure performed in a printing system according to the third exemplary embodiment.

FIG. 16 describes a printing and inspecting procedure performed in a printing system according to this exemplary embodiment. Operations of the apparatuses constituting the printing system and data exchange performed between the apparatuses will be described below in accordance with FIG. 16.

In the setting apparatus 2, the original-image creation unit 201 creates original image data (represented in the set color space (CMYK in this example) and having the set resolution (600 dpi in this example)), and the set gradation correction unit 204 performs the set gradation correction on this original image data, thereby creating and outputting the corrected original image data (CMYK, 600 dpi). The resulting corrected original image data is input to the print image processing unit 102 of the printer 1. In response to this input, in the print image processing unit 102, the print-original-image creation module 1021 creates the print original image data (represented in the output color space (CMYK in this example) and having the output resolution (2400 dpi in this example)) on the basis of the corrected original image data (CMYK, 600 dpi), and the comparison-original-image creation module 1022 creates the comparison original image data (represented in the inspection color space (CMYK in this example) and the inspection resolution (600 dpi in this example)) on the basis of the same corrected original image data (CMYK, 600 dpi).

Then, in the printer 1, the print original image data (CMYK, 2400 dpi) created by the print-original-image creation module 1021 of the print image processing unit 102 is input to the image forming section 10 (more specifically, the exposure devices 13). In response to this input, the image forming section 10 prints an image in colors of cyan, magenta, yellow, and black on the paper P. Subsequently, the printed image on this paper P is read by the image reading section 60 of the printer 1. The image reading section 60 then creates read image data (represented in the input color space (RGB in this example) and having the input resolution (600 dpi in this example)) on the basis of results of reading performed by using three line sensors.

Furthermore, in the printer 1, the read image data (RGB, 600 dpi) having been created by the image reading section 60 is input to the comparison-read-image creation unit 103. In response to this input, the comparison-read-image creation unit 103 creates the comparison read image data (represented in the inspection color space (CMYK in this example) and having the inspection resolution (600 dpi in this example)) based on the read image data (RGB, 600 dpi).

Subsequently, in the inspecting apparatus 3, the comparison original image data (output from the comparison-original-image creation module 1022 of the print image processing unit 102) and the comparison read image data (output from the comparison-read-image creation unit 103), which are obtained from the same original image data, are input to the image comparing unit 302. In response to this input, the image comparing unit 302 compares the comparison original image data (CMYK, 600 dpi) with the comparison read image data (CMYK, 600 dpi) on a pixel-by-pixel basis.

Subsequently, in the inspecting apparatus 3, a result of the comparison performed by the image comparing unit 302 is input to the image defect determining unit 303. In response to this input, the image defect determining unit 303 determines whether or not there is an image defect in the printed image having been printed on the paper P on the basis of the original image data, by using this comparison result. If occurrence of an image defect is detected, this determination result is transmitted to the setting apparatus 2. Then, in the setting apparatus 2, an image for informing a user of occurrence of an image defect is displayed on the UI 202 (see FIG. 14).

Now, a process performed by the print image processing unit 102 in the printing and inspecting procedure according to this exemplary embodiment will be described with reference to FIG. 15. The following description is regarding an example case in which the print image processing unit 102 creates the print original image data and the comparison original image data by adding both the pattern image data and the tracking image data to the corrected original image data.

First, a procedure will be described in which the print-original-image creation module 1021 creates the print original image data on the basis of the corrected original image data.

In the print-original-image creation module 1021, the corrected original image data is input to the pattern image adder 102A. The corrected original image data then undergoes the pattern-image-data addition processing performed by the pattern image adder 102A, the image enhancement processing performed by the image enhancement processor 102B, and the edge enhancement processing performed by the edge enhancement processor 102C.

The corrected original image data having undergone the edge enhancement processing then undergoes the thinning processing (see FIGS. 7A and 7B) performed by the thinning processor 102D and the print gradation correction (see FIGS. 8A to 8C) performed by the print gradation corrector 102E. The corrected original image data having undergone the print gradation correction then undergoes the screen processing performed by the screen processor 102F and the tracking-image-data addition processing performed by the tracking image adder 102G.

The corrected original image data having undergone the tracking-image-data addition processing then undergoes the pixel position correction (see FIGS. 9A and 9B) performed by the pixel position corrector 102H and the exposure control (exposure timing correction, see FIGS. 10A to 10D) performed by the exposure controller 102I. As a result, the print original image data obtained by performing various kinds of image processing on the corrected original image data is output to the exposure devices 13 of the image forming section 10 from the exposure controller 102I.

The procedure in which the print-original-image creation module 1021 creates the print original image data according to this exemplary embodiment is the same as the content of the image processing according to the first exemplary embodiment except that the corrected original image data is input to the pattern image adder 102A instead of the original image data.

Subsequently, a procedure will be described in which the comparison-original-image creation module 1022 creates the comparison original image data on the basis of the corrected original image data.

In the comparison-original-image creation module 1022, the corrected original image data is input to the pattern image adder 102A. The corrected original image data then undergoes the pattern-image-data addition processing performed by the pattern image adder 102A, the image enhancement processing performed by the image enhancement processor 102B, and the edge enhancement processing performed by the edge enhancement processor 102C. The procedure performed so far is the same as the above-described procedure of creating the print original image data.

The corrected original image data having undergone the edge enhancement processing then undergoes the inverse set gradation correction performed by the inverse set gradation corrector 102L. The corrected original image data having undergone the inverse set gradation correction then undergoes the screen processing performed by the screen processor 102F and the tracking-image-data addition processing performed by the tracking image adder 102G. As a result, the comparison original image data obtained by performing various kinds of image processing on the corrected original image data is output to the inspecting apparatus 3 from the tracking image adder 102G via the transmitting-receiving unit 101.

In this exemplary embodiment, the corrected original image data, which is obtained by performing set gradation correction on the original image data, is input to the comparison-original-image creation module 1022 that creates the comparison original image data. If the comparison original image data is created by performing various kinds of image processing, such as those described in the first exemplary embodiment, on this corrected original image data, the set gradation correction based on the type of the paper P, i.e., one kind of the printing unique processing, is reflected in the resulting comparison original image data. That is, the resulting comparison original image data includes unnecessary modifications. Accordingly, in comparison of the comparison read image data obtained by reading a printed image based on the print original image data having undergone the printing unique processing with the comparison original image data having undergone the printing unique processing, an image defect may be determined erroneously because of the printing unique processing having been performed on the comparison original image data even if the content of the original image data is accurately reproduced in the printed image.

However, in this exemplary embodiment, the inverse set gradation correction for cancelling the set gradation correction that has already been performed on the corrected original image data is performed when the comparison original image data is created from the corrected original image data.

In the first to third exemplary embodiments, the comparison original image data is created by the print image processing unit 102 (more specifically, the comparison-original-image creation module 1022) of the printer 1. However, the configuration is not limited to this example. For example, the print image processing unit 102 may be divided into the print-original-image creation module 1021 and the comparison-original-image creation module 1022. The print-original-image creation module 1021 may be included in the printer 1, whereas the comparison-original-image creation module 1022 may be included in the setting apparatus 2 or the inspecting apparatus 3. Alternatively, a computer may be connected to the network 4 and the comparison-original-image creation module 1022 may be included in this computer.

In the first to third exemplary embodiments, the comparison read image data is created by the comparison-read-image creation unit 103 of the printer 1. However, the configuration is not limited to this example. For example, when the set color space of the original image data (or the corrected original image data) is defined as the RGB color space that is the same as the input color space and the set resolution of the original image data (or the corrected original image data) is set equal to the input resolution, i.e., 600 dpi, the read image data is usable as the comparison read image data without performing any conversion. Thus, the comparison-read-image creation unit 103 may be omitted. In this case, however, a color space converter that converts the set color space (RGB) of the original image data or the like into the output color space (CMYK) of the print original image data may be included in the print-original-image creation module 1021 of the print image processing unit 102.

Furthermore, in the third exemplary embodiment, the case has been described in which the comparison-original-image creation module 1022 performs the inverse set gradation correction when the set gradation correction based on the type of the paper P is performed in the setting apparatus 2. However, the correction that may be performed in the setting apparatus 2 is not limited to the gradation correction. When other kinds of correction are performed on the original image data in the setting apparatus 2 in advance, inverse correction for the other kinds of correction may be performed in the comparison-original-image creation module 1022.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A printing system comprising:

a first image creation section that creates first image data by performing first image processing on original image data, the first image processing including correction of a characteristic that is unique to an image forming section and first processing that is different from the correction of a characteristic that is unique to the image forming section;

the image forming section that forms an image on a recording medium using the first image data input to the image forming section;

a second image creation section that creates second image data by performing second image processing on the original image data, the second image processing including the first processing, but not including the correction of a characteristic that is unique to the image forming section;

an image reading section that reads the image having been formed on the recording medium by the image forming section to obtain read image data; and a detection section that detects a defect in the image having been formed on the recording medium by the image forming section, by comparing the read image data resulting from the reading performed by the image reading section or comparison image data obtained by performing processing on the read image data with the second image data on a pixel-by-pixel basis, the read image data and the second image data being obtained from the same original image data.

2. The printing system according to claim 1, wherein the correction of a characteristic that is unique to the image forming section includes correction of a difference in the gradation value or position of a pixel, the difference being caused by the characteristic that is unique to the image forming section.

3. The printing system according to claim 1, wherein the first image creation section creates first image data corresponding to an output resolution of the image forming section, by performing the first image processing on the original image data, and wherein the second image creation section creates second image data corresponding to an input resolution of the image reading section, by performing the second image processing on the original image data.

4. The printing system according to claim 1, wherein the second image processing further includes inverse correction that is opposite to correction that has already been performed on the original image data when the original image data is input, and wherein the correction that has already been performed on the original image data is correction of a characteristic that is unique to the recording medium or correction of another characteristic unique to the image forming section which is different from the correction included in the first image processing.

5. The printing system according to claim 1, wherein the image forming section includes a photoconductor, and an exposure device that exposes the photoconductor to light so as to form a latent image on the photoconductor, and wherein the correction of a characteristic that is unique to the image forming section includes correction of a difference in the position of a pixel, the difference being caused by a characteristic of the exposure device.

6. The printing system according to claim 1, wherein the image forming section includes a photoconductor, and an exposure device that exposes the photoconductor to light so as to form a latent image on the photoconductor, and wherein the correction of a characteristic that is unique to the image forming section includes correction of a difference in the position of a pixel, the difference being caused by the direction in which the exposure device scans the photoconductor for exposure.

7. An image forming apparatus comprising:

a first image creation section that creates first image data by performing first image processing on original image data, the first image processing including correction of a characteristic that is unique to an image forming section and first processing that is different from the correction of a characteristic that is unique to the image forming section;

the image forming section that forms an image on a recording medium using the first image data input to the image forming section;

a second image creation section that creates second image data by performing second image processing on the original image data, the second image processing including the first processing, but not including the correction of a characteristic that is unique to the image forming section;

an image reading section that reads the image having been formed on the recording medium by the image forming section to obtain read image data; and an output section that outputs the read image data resulting from the reading performed by the image reading section or comparison image data obtained by performing processing on the read image data, and the second image data, the read image data and the second image data being obtained from the same original image data.

8. A printing method comprising:

creating first image data by performing first image processing on original image data, the first image processing including correction of a characteristic that is unique to a printer and first processing that is different from the correction of a characteristic that is unique to the printer;

forming, by the printer, an image on a recording medium using the first image data;

creating second image data by performing second image processing on the original image data, the second image processing including the first processing, but not including the correction of a characteristic that is unique to the forming;

reading the image having been formed on the recording medium in the forming to obtain read image data; and detecting a defect in the image having been formed on the recording medium in the forming, by comparing the read image data resulting from the reading or comparison image data obtained by performing processing on the read image data with the second image data on a pixel-by-pixel basis, the read image data and the second image data being obtained from the same original image data.

* * * * *